United States Patent
Nakaoka

(10) Patent No.: US 11,149,865 B2
(45) Date of Patent: Oct. 19, 2021

(54) HIGH-PRESSURE PUMP

(71) Applicant: DENSO CORPORATION, Kariya (JP)

(72) Inventor: Masaharu Nakaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 134 days.

(21) Appl. No.: 16/550,373

(22) Filed: Aug. 26, 2019

(65) Prior Publication Data

US 2019/0376606 A1    Dec. 12, 2019

Related U.S. Application Data

(63) Continuation of application No. PCT/JP2018/008213, filed on Mar. 5, 2018.

(30) Foreign Application Priority Data

Mar. 7, 2017  (JP) .............................. JP2017-043213

(51) Int. Cl.
| | |
|---|---|
| *F16K 15/06* | (2006.01) |
| *F02M 63/00* | (2006.01) |
| *F02M 59/46* | (2006.01) |
| *F02M 59/36* | (2006.01) |
| *F02B 33/00* | (2006.01) |

(52) U.S. Cl.
CPC ......... *F16K 15/063* (2013.01); *F02M 59/462* (2013.01); *F02M 63/0077* (2013.01); *F02B 33/00* (2013.01); *F02M 59/368* (2013.01)

(58) Field of Classification Search
CPC .............. F16K 15/063; F02M 63/0077; F02M 59/462; F02M 59/368; F02B 33/00
See application file for complete search history.

(56) References Cited

U.S. PATENT DOCUMENTS 4,467,703 A * 8/1984 Redwine ............... F04B 53/162
                                                                 417/539
4,889,151 A * 12/1989 Oten ....................... F16K 17/08
                                                                 137/71

(Continued)

FOREIGN PATENT DOCUMENTS

| DE | 103 53 314 | 10/2014 |
|---|---|---|
| JP | 2000-230463 | 8/2000 |

(Continued)

OTHER PUBLICATIONS

U.S. Appl. No. 16/550,362 of Koshimoto, et al., filed Aug. 26, 2019 (54 pages).

*Primary Examiner* — Jessica Cahill
*Assistant Examiner* — Patrick C Williams
(74) *Attorney, Agent, or Firm* — Nixon & Vanderhye, PC

(57) ABSTRACT

A discharge valve includes: a valve main body that slidably contacts an inner peripheral wall of a tubular portion; and a primary passage that is formed at the valve main body and is located between the valve main body and the inner peripheral wall of the tubular portion. A stopper includes: a stopper main body that is formed separately from the tubular portion while the stopper main body is located on a side of the discharge valve that is opposite to the discharge valve seat; a movement limit surface that is configured to limit movement of the discharge valve in a direction away from the discharge valve seat; and a secondary passage that is formed at the stopper main body.

12 Claims, 13 Drawing Sheets

(56) References Cited

U.S. PATENT DOCUMENTS

| | | | | |
|---|---|---|---|---|
| 4,948,349 A | * | 8/1990 | Koiwa | F04B 53/1002 |
| | | | | 137/516.11 |
| 7,931,126 B2 | * | 4/2011 | Croci | F16N 21/02 |
| | | | | 184/105.3 |
| 8,408,886 B2 | * | 4/2013 | Fabbri | F04B 53/007 |
| | | | | 417/454 |
| 2002/0179153 A1 | * | 12/2002 | Taylor | F16K 1/302 |
| | | | | 137/540 |
| 2006/0222538 A1 | | 10/2006 | Inoue et al. | |
| 2011/0308967 A1 | * | 12/2011 | Byrne | C23F 13/06 |
| | | | | 205/730 |
| 2015/0292457 A1 | | 10/2015 | Kleindl et al. | |

FOREIGN PATENT DOCUMENTS

| | | |
|---|---|---|
| JP | 2012-149595 | 8/2012 |
| JP | 2012-229668 | 11/2012 |
| WO | 2018/164026 | 9/2018 |

\* cited by examiner

PRESSURIZATION DIRECTION

COUNTER-PRESSURIZATION DIRECTION

VALVE CLOSING DIRECTION ⟷ VALVE OPENING DIRECTION

VALVE CLOSING DIRECTION ⟷ VALVE OPENING DIRECTION

VALVE CLOSING DIRECTION ←→ VALVE OPENING DIRECTION

HIGH-PRESSURE PUMP

CROSS REFERENCE TO RELATED APPLICATIONS

This application is a continuation application of International Patent Application No. PCT/JP2018/008213 filed on Mar. 5, 2018, which designated the U.S. and claims the benefit of priority from Japanese Patent Application No. 2017-43213 filed on Mar. 7, 2017. The entire disclosures of all of the above applications are incorporated herein by reference.

TECHNICAL FIELD

The present disclosure relates to a high-pressure pump.

BACKGROUND

Previously, there is known a high-pressure pump that is installed to an internal combustion engine to pressurize fuel and discharge the pressurized fuel to the internal combustion engine. For example, in one previously proposed high-pressure pump, a discharge valve device is placed in a discharge passage that conducts fuel pressurized in a pressurizing chamber and is discharged from the pressurizing chamber. The discharge valve device enables a flow of the fuel from the pressurizing chamber to a discharge passage and limits a flow of the fuel from the discharge passage to the pressurizing chamber.

SUMMARY

This section provides a general summary of the disclosure, and is not a comprehensive disclosure of its full scope or all of its features.

According to the present disclosure, there is provided a high-pressure pump that includes a valve and a stopper. The valve includes: a valve main body that slidably contacts an inner peripheral wall of a tubular portion through an outer periphery of the valve main body and is configured to contact a valve seat; and a primary passage that is formed at the valve main body and is located between the valve main body and the inner peripheral wall of the tubular portion while the primary passage is configured to conduct the fuel from one side of the valve main body, at which the valve seat is located, to another side of the valve main body, which is opposite to the valve seat. The stopper includes: a stopper main body that is formed separately from the tubular portion while the stopper main body is located on the another side of the valve that is opposite to the valve seat; a movement limit surface that is configured to limit movement of the valve in a direction away from the valve seat when the movement limit surface contacts the valve.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
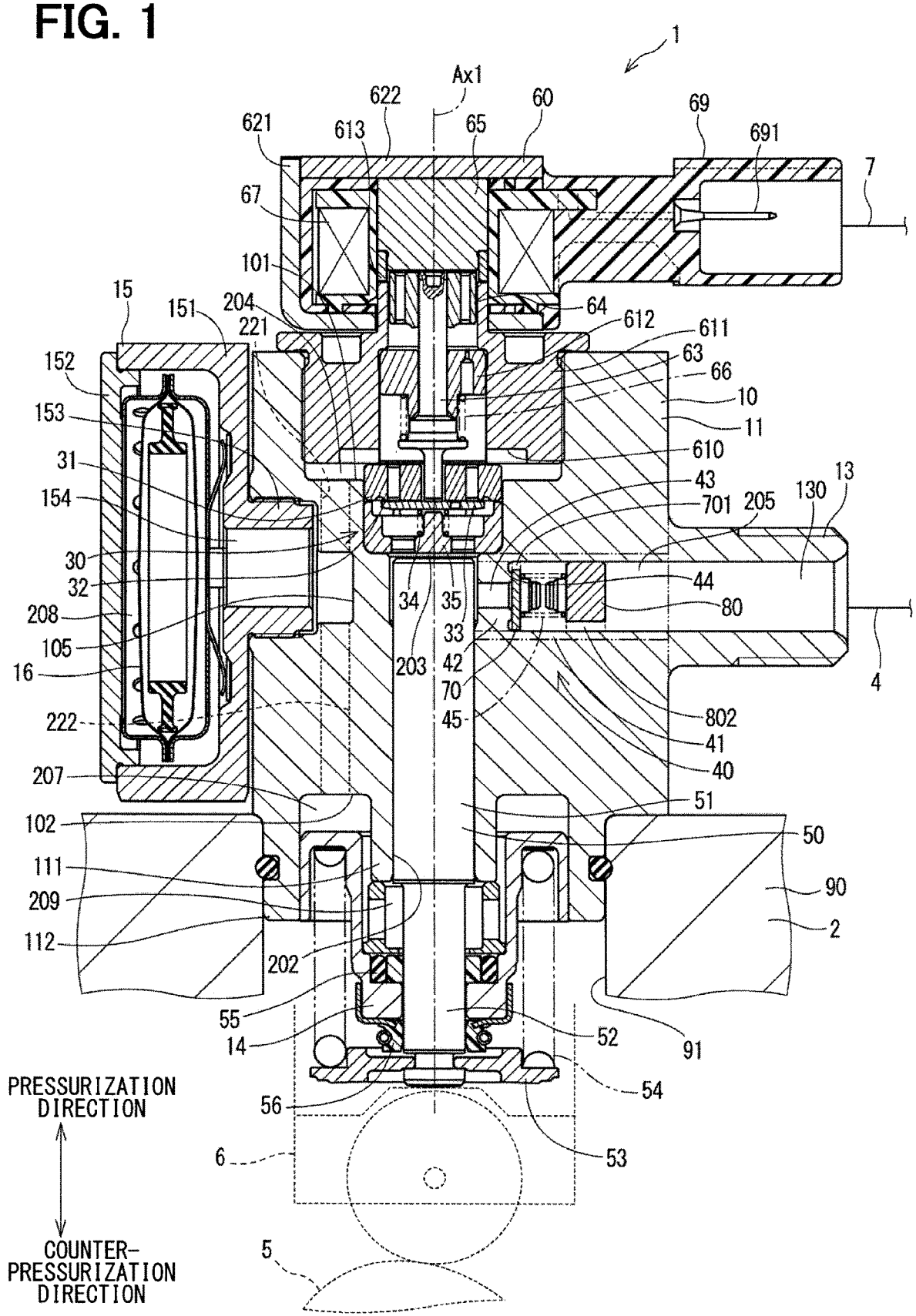
FIG. 1 is a cross-sectional view showing a high-pressure pump according to a first embodiment.

In a previously proposed high-pressure pump, a discharge valve device is placed in a discharge passage that conducts fuel pressurized in a pressurizing chamber and is discharged from the pressurizing chamber. The discharge valve device enables a flow of the fuel from the pressurizing chamber to a discharge passage and limits a flow of the fuel from the discharge passage to the pressurizing chamber. The discharge valve device includes: a tubular portion; a valve that is shaped in a circular disk form and slidably contacts an inner peripheral wall of the tubular portion through an outer periphery of the valve such that axial movement of the valve is guided by the inner peripheral wall of the tubular portion; and a stopper that is configured to limit movement of the valve toward a side, which is opposite to the pressurizing chamber, when the stopper contacts the valve. The stopper is formed integrally with the tubular portion in one piece such that the stopper closes an end part of the tubular portion. Furthermore, a valve seat, which is configured to contact the valve, is formed at an inner wall of the housing. The valve seat is formed at the housing, and the tubular portion and the stopper are formed integrally in one piece, so that the structure is simplified. However, in the above-described discharge valve device, a passage, which conducts the fuel from the pressurizing chamber side of the valve to the other side of the valve, is formed at the tubular portion at a location that is on a radially outer side of the outer periphery of the valve that is shaped in the circular disk form. Therefore, the configuration of the component, in which the tubular portion and the stopper are formed integrally in one piece, may possibly be complicated.

A high-pressure pump of the present disclosure includes a housing, a tubular portion, a seat portion, a valve and a stopper.

The housing includes a pressurizing chamber, which is configured to pressurize fuel in the pressurizing chamber.

The tubular portion forms a discharge passage, which is configured to conduct the fuel discharged from the pressurizing chamber.

The seat portion includes: an upstream passage, which connects between the discharge passage and the pressurizing chamber; and a valve seat, which is formed on a side of the upstream passage where the discharge passage is located.

The valve includes: a valve main body that slidably contacts an inner peripheral wall of the tubular portion through an outer periphery of the valve main body such that axial movement of the valve main body is guided by the inner peripheral wall of the tubular portion while the valve main body is configured to contact the valve seat; and a primary passage that is formed at the valve main body and is located between the valve main body and the inner peripheral wall of the tubular portion. The primary passage is configured to conduct the fuel from one side of the valve main body, at which the valve seat is located, to another side of the valve main body, which is opposite to the valve seat.

The stopper includes: a stopper main body that is a member, which is formed separately from the tubular portion, wherein the stopper main body is located on the another side of the valve that is opposite to the valve seat; a movement limit surface that is configured to limit movement of the valve in a direction away from the valve seat when the movement limit surface contacts the valve; and a secondary passage that is formed at the stopper main body and is configured to conduct the fuel from one side of the stopper main body, at which the valve is located, to another side of the stopper main body, which is opposite to the valve.

The primary passage is located on one side of the movement limit surface where the valve seat is located.

The secondary passage is located on another side of the movement limit surface, which is opposite to the valve seat.

In the present disclosure, the valve main body slidably contacts the inner peripheral wall of the tubular portion through the outer periphery of the valve main body such that the axial movement of the valve main body is guided by the inner peripheral wall of the tubular portion. Furthermore, the primary passage is configured to conduct the fuel from the discharge valve seat side of the valve main body to the other side of the valve main body that is opposite to the discharge valve seat, and the primary passage is formed at the valve main body and is located between the valve main body and the inner peripheral wall of the tubular portion. The stopper is made of the member that is formed separately from the tubular portion. As described above, the tubular portion is formed separately from the stopper, and the primary passage is not formed at the tubular portion. Therefore, the configuration of the tubular portion can be simplified. Furthermore, the primary passage is not formed in the tubular portion but is formed at the valve main body of the discharge valve and is located between the valve main body and the inner peripheral wall of the tubular portion, so that the radial size of the tubular portion can be reduced.

Hereinafter, a high-pressure pump of various embodiments of the present disclosure will be described with reference to the drawings. In the following embodiments, substantially identical structural portions will be indicated by the same reference signs and will not be described redundantly for the sake of simplicity. Furthermore, in the following embodiments, the substantially identical structural portions have the identical or similar effects and advantages.

First Embodiment

Figure 2:
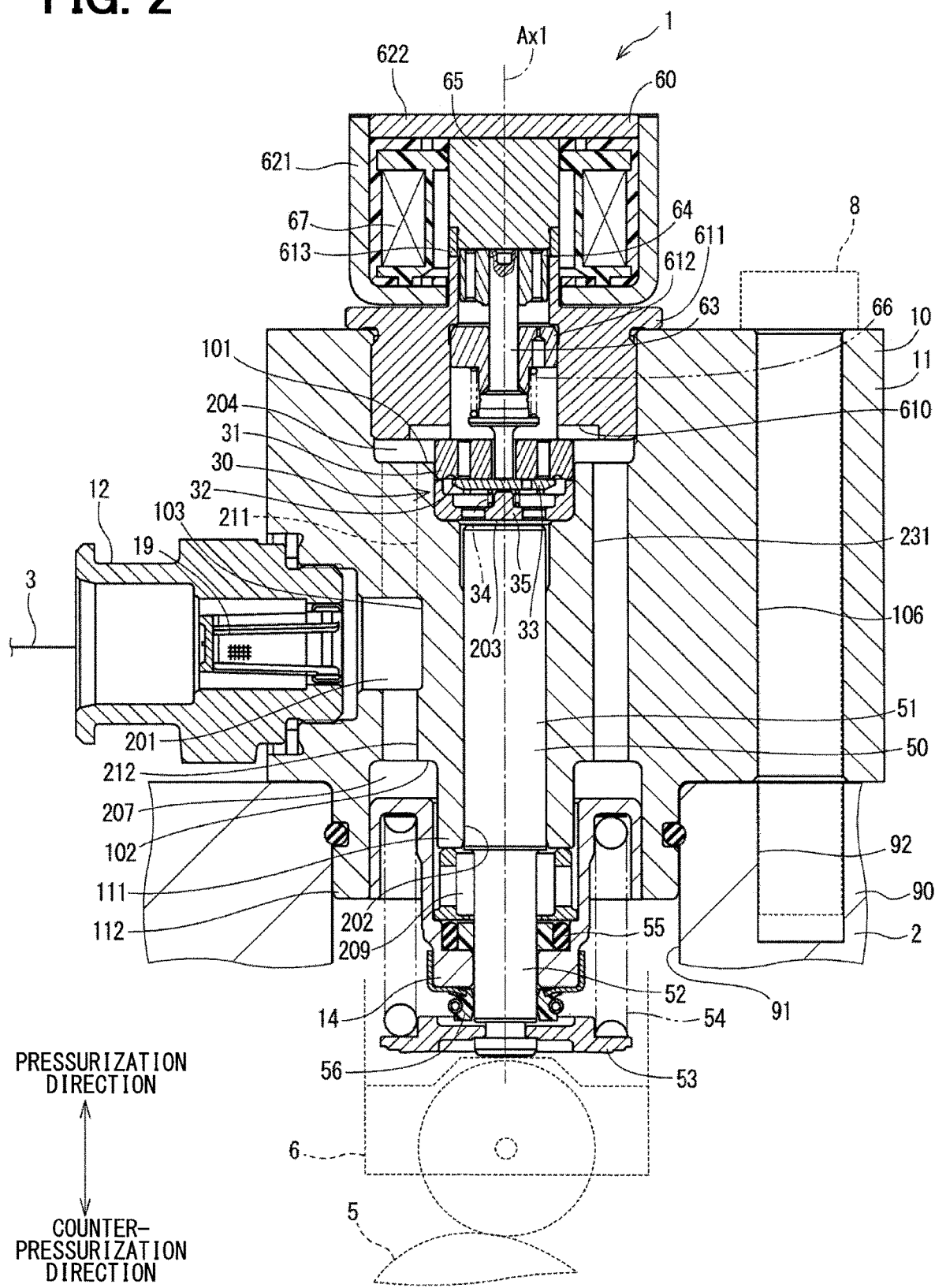
FIG. 2 is a cross-sectional view showing the high-pressure pump according to the first embodiment.

FIGS. 1 and 2 show a high-pressure pump according to a first embodiment.

The high-pressure pump 1 is installed to a vehicle (not shown). The high-pressure pump 1 is a pump that supplies fuel under a high pressure to, for example, an engine 2 that serves as an internal combustion engine. The fuel, which is supplied from the high-pressure pump 1 to the engine 2, is, for example, gasoline. Specifically, a fuel supply subject of the high-pressure pump 1 is a gasoline engine.

The fuel, which is stored in a fuel tank (not shown), is supplied to the high-pressure pump 1 by a fuel pump (not shown) through a pipe 3 (see FIG. 2). The high-pressure pump 1 pressurizes the fuel supplied from the fuel pump and discharges the pressurized fuel to a fuel rail through a pipe 4 (see FIG. 1). In this way, the fuel in the fuel rail is accumulated and is injected at the engine 2 from fuel injection valves connected to the fuel rail.

As shown in FIGS. 1 and 2, the high-pressure pump 1 includes a housing 10, a pulsation damper 16, a suction valve device 30, a plunger 50, a spring (serving as a plunger urging member) 54, an electromagnetic drive device 60 and a discharge valve device 40.

The housing 10 includes a housing main body 11, an inlet 12, a discharge outlet 13, a damper chamber forming portion 15 and a seat upper 14.

The housing main body 11 is shaped in a substantially cylindrical rod form and is made of metal, such as stainless steel. The housing main body 11 includes an upper recess 101, a lower recess 102, an inflow recess 103, a damper recess 105, an extended tubular portion 111, an extended tubular portion 112, an inflow port 201, a plunger hole 202, a pressurizing chamber 203, a suction passage 204, a discharge passage 205, a fuel reservoir 207, a plurality of inflow-side upper passages 211, an inflow-side lower passage 212, a plurality of damper-side upper passages 221, a plurality of damper-side lower passages 222 and a connection passage 231.

The upper recess 101 is formed such that the upper recess 101 is in a circular form and is recessed from one end surface toward the other end surface of the housing main body 11. The lower recess 102 is formed such that the lower recess 102 is in a ring form and is recessed from the other end surface toward the one end surface of the housing main body 11. Here, the upper recess 101 and the lower recess 102 are formed to be coaxial with each other. The expression of "coaxial" should not be limited to a precisely coaxial state and may include a state where the axes are slightly deviated from each other. Furthermore, in a case where two members are placed coaxial with each other, the axes of the members may possibly deviate relative to one another depending on a state of use. This is also true in the following description.

The inflow recess 103 is formed such that the inflow recess 103 is in a circular form and is recessed from a peripheral wall of the housing main body 11, which is located between the one end surface and the other end surface of the housing main body 11, toward a center of the housing main body 11. The damper recess 105 is formed such that the damper recess 105 is in a circular form and is recessed from the peripheral wall of the housing main body 11, which is located between the one end surface and the other end surface of the housing main body 11, toward the center of the housing main body 11.

The inflow recess 103 and the damper recess 105 are formed such that an axis of the inflow recess 103 and an axis of the damper recess 105 are perpendicular to the axis of the upper recess 101 and of the lower recess 102. The expression of "perpendicular" should not be limited to the two straight lines precisely perpendicular to each other and may include two straight lines that are slightly non-perpendicular to each other. This is also true in the following description.

The extended tubular portion 111 is formed such that the extended tubular portion 111 is in a substantially cylindrical tubular form and extends from the inside of the lower recess 102 at the other end surface of the housing main body 11. At the other end surface of the housing main body 11, the extended tubular portion 112 is formed such that the extended tubular portion 112 is in a substantially cylindrical tubular form and extends at the outside of the lower recess 102.

The inflow port 201 is formed at a bottom side of the inflow recess 103.

The plunger hole 202 is formed such that the plunger hole 202 is in a substantially cylindrical tubular form and connects between a bottom of the upper recess 101 and the other end surface of the housing main body 11. The plunger hole 202 is formed to be coaxial with the upper recess 101 and the lower recess 102.

The pressurizing chamber 203 is formed at an end part of the plunger hole 202 located on the upper recess 101 side.

The suction passage 204 is formed at a portion of the upper recess 101, which is located on the pressurizing chamber 203 side, and the suction passage 204 is connected to the pressurizing chamber 203.

The discharge passage 205 is formed to extend toward a radially outer side of the housing main body 11. The discharge passage 205 is formed such that an axis of the discharge passage 205 is perpendicular to an axis Ax1 of the plunger hole 202. The discharge passage 205 is formed at an inside of a tubular portion 41 of the discharge valve device 40 described later.

The fuel reservoir 207 is formed at the lower recess 102. Specifically, the fuel reservoir 207 is shaped in a ring form.

The inflow-side upper passages 211 are formed to connect between the inflow port 201 and the suction passage 204. In the present embodiment, the number of the inflow-side upper passages 211 formed at the housing main body 11 is two, and axes of these inflow-side upper passages 211 are parallel to the axis Ax1 of the plunger hole 202. In this way, the suction passage 204 is formed such that the suction passage 204 is connected to the pressurizing chamber 203 and is communicated with the inflow port 201 through the inflow-side upper passages 211. Here, the expression of "parallel" should not be limited to the two straight lines precisely parallel to each other and may include two straight lines that are slightly non-parallel to each other. This is also true in the following description.

The inflow-side lower passage 212 is formed to connect between the inflow port 201 and the fuel reservoir 207. In the present embodiment, the number of the inflow-side lower passage 212 formed at the housing main body 11 is one, and an axis of the inflow-side lower passage 212 is parallel to the axis Ax1 of the plunger hole 202.

The damper-side upper passages 221 are formed to connect between a space at an inside of the damper recess 105 and the suction passage 204. In the present embodiment, the number of the damper-side upper passages 221 formed at the housing main body 11 is two, and axes of these damper-side upper passages 221 are parallel to the axis Ax1 of the plunger hole 202.

The damper-side lower passages 222 are formed to connect between the space at the inside of the damper recess 105 and the fuel reservoir 207. In the present embodiment, the number of the damper-side lower passages 222 formed at the housing main body 11 is two, and axes of these damper-side lower passages 222 are parallel to the axis Ax1 of the plunger hole 202.

The damper-side upper passages 221 and the damper-side lower passages 222 are formed on an opposite side of the plunger hole 202, which is opposite to the discharge passage 205 (see FIG. 1).

The connection passage 231 is formed to connect between the fuel reservoir 207 and the suction passage 204. In the present embodiment, the number of the connection passage 231 formed at the housing main body 11 is one, and an axis of the connection passage 231 is parallel to the axis Ax1 of the plunger hole 202.

Here, one end part of the connection passage 231 is connected to the suction passage 204, and the other end part of the connection passage 231 is communicated with the suction passage 204 through the fuel reservoir 207, the inflow-side lower passage 212, the inflow port 201 and the inflow-side upper passages 211, or through the damper-side lower passages 222, the space at the inside of the damper recess 105 and the damper-side upper passages 221.

The inlet 12 is shaped in a tubular form and is made of metal, such as stainless steel. One end part of the inlet 12 is threadably engaged with an inner wall of the inflow recess 103 of the housing main body 11. The pipe 3 is connected to the other end part of the inlet 12. Thereby, the fuel flows from the pipe 3 into the inflow port 201 through the inlet 12. A filter 19 is installed at the inside of the inlet 12. The filter 19 can capture foreign objects contained in the fuel that flows into the inflow port 201 through the inlet 12.

The fuel, which enters the inflow port 201, can flow to the suction passage 204 through the inflow-side upper passages 211. Furthermore, the fuel, which enters the inflow port 201, can flow to the fuel reservoir 207 through the inflow-side lower passage 212.

The fuel in the suction passage 204 and the fuel in the fuel reservoir 207 can flow back and forth between the suction passage 204 and the fuel reservoir 207 through the damper-side upper passages 221, the space at the inside of the damper recess 105 and the damper-side lower passages 222.

Furthermore, the fuel in the suction passage 204 and the fuel in the fuel reservoir 207 can flow back and forth between the suction passage 204 and the fuel reservoir 207 through the connection passage 231.

The discharge outlet 13 is formed integrally with the housing main body 11 in one piece such that the discharge outlet 13 is shaped in a tubular form and radially outwardly extends from the peripheral wall of the housing main body 11, which is located between the one end surface and the other end surface of the housing main body 11. A discharge passage 130 is formed at an inside of the discharge outlet 13. The discharge passage 130 is connected to one side of the discharge passage 205, which is opposite to the pressurizing chamber 203. The pipe 4 is connected to the other end part of the discharge outlet 13.

The damper chamber forming portion 15 includes a first member 151, a second member 152, a projection 153 and a hole 154. The first member 151 is shaped in a bottomed cylindrical tubular form and is made of metal, such as stainless steel. The second member 152 is shaped in a substantially circular disk form and is made of metal, such as stainless steel. The second member 152 is placed to close an opening of the first member 151. Thereby, a damper chamber 208, which is shaped in a substantially circular disk form, is formed between the first member 151 and the second member 152.

The projection 153 is formed to project from a center of a bottom of the first member 151 toward a side that is opposite to the second member 152. The damper chamber forming portion 15 is formed such that the projection 153 is threadably engaged with an inner wall of the damper recess 105 of the housing main body 11. Here, the first member 151 and the second member 152 are placed such that an axis of the first member 151 and the second member 152 is perpendicular to the axis Ax1 of the plunger hole 202.

The hole 154 extends through the bottom of the first member 151 and the projection 153. The hole 154 connects between the damper chamber 208 and the space at the inside of the damper recess 105.

The pulsation damper 16 is placed at the damper chamber 208. For example, the pulsation damper 16 is formed such that outer peripheral edges of two diaphragms are joined together to form a hollow circular disk-shaped space between the two diaphragms, and a gas of a predetermined pressure is sealed at the inside of the pulsation damper 16. Here, the pulsation damper 16 is placed at the damper chamber 208 such that an axis of the pulsation damper 16 is perpendicular to the axis Ax1 of the plunger hole 202.

The pulsation damper 16 is resiliently deformed according to a change in a pressure at the inside of the damper chamber 208. Thereby, the pressure pulsation at the inside of the damper chamber 208 can be reduced.

The suction valve device 30 is placed at the suction passage 204.

The suction valve device 30 includes a suction valve seat element 31, a suction valve seat 32, a suction valve 33, a spring 34 and a stopper 35.

The suction valve seat element 31 is shaped in a substantially cylindrical tubular form and is made of metal, such as stainless steel. The suction valve seat element 31 is placed at the suction passage 204 such that the suction valve seat element 31 is coaxial with the plunger hole 202. The suction valve seat element 31 includes a plurality of holes that are placed on a radially outer side of a center hole and connect between one end surface and the other end surface of the suction valve seat element 31. The suction valve seat 32 is formed around the above-described holes at the end surface of the suction valve seat element 31 placed on the pressurizing chamber 203 side.

The suction valve 33 is shaped in a substantially circular disk form and is made of metal, such as stainless steel.

The stopper 35 is shaped in a substantially circular disk form and is made of metal, such as stainless steel. The stopper 35 is located on the pressurizing chamber 203 side of the suction valve 33 such that an outer periphery of the stopper 35 is fitted to an inner wall of the upper recess 101 of the housing main body 11. Here, an outer periphery of the surface of the stopper 35, which is located on the pressurizing chamber 203 side, contacts the bottom of the upper recess 101. Furthermore, an outer periphery of an opposite part of the stopper 35, which is opposite to the pressurizing chamber 203, contacts an outer periphery of the suction valve seat element 31. The stopper 35 includes a plurality of holes that connect between one surface and an opposite surface of the stopper 35.

The suction valve 33 is configured to reciprocate between the suction valve seat element 31 and the stopper 35. One end surface of the suction valve 33 is configured to contact the suction valve seat 32. The suction valve 33 opens or closes the suction passage 204 when the suction valve 33 is spaced away from or contacts the suction valve seat 32. Specifically, the suction valve device 30 is configured to enable or limit a flow of the fuel between the pressurizing chamber 203 side of the suction passage 204 and the other side of the suction passage 204, which is opposite to the pressurizing chamber 203, at the valve opening time or the valve closing time of the suction valve device 30.

The other end surface of the suction valve 33 is configured to contact the stopper 35. When the suction valve 33 contacts the stopper 35, the stopper 35 limits movement of the suction valve 33 toward the pressurizing chamber 203.

The suction valve seat element 31 and the stopper 35 are fixed such that the suction valve seat element 31 and the stopper 35 are clamped between the support 611 of the electromagnetic drive device 60 and the housing main body 11 as described later.

The spring 34 is, for example, a coil spring and is located between the suction valve 33 and the stopper 35. The spring 34 urges the suction valve 33 toward the suction valve seat 32.

The plunger 50 is placed at the plunger hole 202 of the housing main body 11. The plunger 50 is shaped in a substantially cylindrical rod form and is made of metal, such as stainless steel. The plunger 50 includes a large diameter portion 51 and a small diameter portion 52. An outer diameter of the small diameter portion 52 is smaller than an outer diameter of the large diameter portion 51. The large diameter portion 51 and the small diameter portion 52 are coaxial with each other and are formed integrally in one piece. The plunger 50 is placed in the plunger hole 202 such that one end part of the plunger 50, i.e., an end part of the large diameter portion 51 is placed in the pressurizing chamber 203. The plunger 50 is configured to reciprocate in the axial direction to increase and decrease a volume of the pressurizing chamber 203.

The outer diameter of the large diameter portion 51 of the plunger 50 is substantially equal to or slightly smaller than an inner diameter of the plunger hole 202. Thereby, an outer peripheral wall of the large diameter portion 51 is slidable along the inner peripheral wall of the plunger hole 202, and thereby the plunger 50 is supported by the plunger hole 202 in a manner that enables reciprocation of the plunger 50 in the axial direction.

When the plunger 50 is moved to increase the volume of the pressurizing chamber 203, the suction valve device 30 is opened, and the fuel is drawn into the pressurizing chamber 203 through the suction valve device 30. In contrast, when the plunger 50 is moved to decrease the volume of the pressurizing chamber 203, the suction valve device 30 is closed, and the fuel in the pressurizing chamber 203 is pressurized.

Hereinafter, a moving direction of the plunger 50 for decreasing the volume of the pressurizing chamber 203 will be referred to as a pressurization direction, and a moving direction of the plunger 50 for increasing the volume of the pressurizing chamber 203 will be referred to as a counter-pressurization direction.

The seat upper 14 is shaped in a tubular form and is made of metal, such as stainless steel. The seat upper 14 is placed on the radially outer side of the plunger 50 and the extended tubular portion 111 and is fitted to the inner wall of the extended tubular portion 112 through an outer peripheral wall of the seat upper 14. The seat upper 14 forms the fuel reservoir 207 between the seat upper 14 and the lower recess 102 of the housing main body 11.

The seat upper 14 is installed such that a clearance in a substantially cylindrical tubular form is formed between an inner peripheral wall of the seat upper 14 and an outer peripheral wall of the extended tubular portion 111 and an outer peripheral wall of the small diameter portion 52. A seal 55, which is in an annular form, is placed between the inner peripheral wall of the seat upper 14 and the outer peripheral wall of the small diameter portion 52 of the plunger 50. The seal 55 includes a radially inner ring made of fluorine resin and a radially outer ring made of rubber. A thickness of a fuel oil film, which is formed around the small diameter portion 52 of the plunger 50, is adjusted by the seal 55, so that leakage of the fuel to the engine 2 is limited. Furthermore, an oil seal 56 is placed at an end part of the seat upper 14, which is opposite to the pressurizing chamber 203. The oil seal 56 adjusts a thickness of an oil film, which is formed around the small diameter portion 52 of the plunger 50, so that intrusion of the oil into the high-pressure pump 1 is limited.

A variable volume chamber 209, a volume of which changes at the time of reciprocation of the plunger 50, is formed between the seal 55 and a step surface while the step surface is formed between the large diameter portion 51 and the small diameter portion 52 of the plunger 50.

The variable volume chamber 209 is connected to the fuel reservoir 207 through the space between the inner peripheral wall of the seat upper 14 and the outer peripheral wall of the extended tubular portion 111.

A spring seat 53, which is shaped in a substantially circular disk form, is installed to an end part of the small diameter portion 52 of the plunger 50, which is opposite to the large diameter portion 51.

The spring 54 is placed between the spring seat 53 and the seat upper 14. The spring 54 is, for example, a coil spring. One end part of the spring 54 is connected to the plunger 50 through the spring seat 53, and the other end part of the spring 54 contacts the seat upper 14. The spring 54 urges the plunger 50 through the spring seat 53 toward the side, which is opposite to the pressurizing chamber 203, i.e., in the counter-pressurization direction.

When the high-pressure pump 1 is installed to the engine 2, a lifter 6 is installed to the end part of the small diameter portion 52 of the plunger 50, which is opposite to the large diameter portion 51.

In the state where the high-pressure pump 1 is installed to the engine 2, the lifter 6 contacts a cam 5 of the cam shaft, which is rotated synchronously with a drive shaft of the engine 2. Thereby, when the engine 2 is rotated, the plunger 50 is reciprocated in the axial direction through the rotation of the cam 5. At this time, the volume of the pressurizing chamber 203 and the volume of the variable volume chamber 209 are periodically changed.

The electromagnetic drive device 60 is placed on the opposite side of the suction valve device 30, which is opposite to the plunger 50. The electromagnetic drive device 60 includes supports 611, 612, a tubular member 613, yokes 621, 622, a needle 63, a movable core 64, a stationary core 65, a spring 66, a coil 67 and a connector 69.

The support 611 is shaped in a substantially cylindrical tubular form and is made of, for example, a magnetic material. The support 611 is installed to the housing main body 11 such that one end part of the support 611 is threadably engaged with an inner wall of the upper recess 101 of the housing main body 11. Specifically, the support 611 is installed to an opening of the upper recess 101 of the housing main body 11 such that the support 611 is coaxial with the plunger hole 202. An end surface of the support 611, which is located on the pressurizing chamber 203 side, contacts an end surface of the suction valve seat element 31, which is opposite to the pressurizing chamber 203. The support 611 urges the stopper 35 against the bottom of the upper recess 101 of the housing main body 11 through the suction valve seat element 31. Specifically, the support 611 fixes the suction valve seat element 31 and the stopper 35 such that the suction valve seat element 31 and the stopper 35 are clamped between the support 611 and the housing main body 11. A plurality of grooves 610 is formed at an inner periphery of an end surface of the support 611 located on the suction valve seat element 31 side. Therefore, at the suction passage 204, the fuel, which is located on the suction valve seat element 31 side of the support 611, can flow into a space at the inside of the support 611 through the grooves 610.

The support 612 is shaped in a substantially cylindrical tubular form and is made of, for example, a non-magnetic material. The support 612 is formed coaxial with the support 611 such that an outer peripheral wall of the support 612 is fitted to an inner peripheral wall of the support 611.

The tubular member 613 is shaped in a substantially cylindrical tubular form and is made of, for example, a non-magnetic material. The tubular member 613 is placed on a side of the support 611, which is opposite to the pressurizing chamber 203, such that the tubular member 613 is coaxial with the support 611.

The yoke 621 is shaped in a bottomed cylindrical tubular form and is made of, for example, a magnetic material. The yoke 621 has a hole at a center of a bottom of the yoke 621. The yoke 621 is placed on a side of the support 611, which is opposite to the pressurizing chamber 203, such that the support 611 is placed at the inside of the hole of the yoke 621. The yoke 621 is coaxial with the support 611.

The yoke 622 is shaped in a substantially circular disk form and is made of, for example, a magnetic material. The yoke 622 is installed to the yoke 621 such that the yoke 622 closes an opening of the yoke 621.

The needle 63 is shaped in a rod form and is made of, for example, metal. The needle 63 is supported by a center hole of the support 612 in a manner that enables reciprocation of the needle 63. One end part of the needle 63 is inserted through a center hole of the suction valve seat element 31 and is configured to contact the end surface of the suction valve 33 that is opposite to the pressurizing chamber 203. The needle 63 is coaxial with the plunger hole 202.

The movable core 64 is shaped in a substantially cylindrical tubular form and is made of, for example, a magnetic material. The movable core 64 is installed to the other end part of the needle 63.

The stationary core 65 is made of, for example, a magnetic material and is placed on a side of the tubular member 613, which is opposite to the support 611.

The spring 66 is, for example, a coil spring and is placed between an annular projection of the needle 63, which radially outwardly projects from an outer peripheral wall of the needle 63, and the support 612. The spring 66 urges the needle 63 toward the pressurizing chamber 203 side. An urging force of the spring 66 is set to be larger than an urging force of the spring 34. Therefore, the suction valve 33 is spaced from the suction valve seat 32. A center of an end surface of the suction valve 33, which is located on the pressurizing chamber 203 side, contacts a projection that projects from a center of the stopper 35. The needle 63 and the movable core 64 are spaced from the stationary core 65.

The coil 67 is formed into a substantially cylindrical tubular form by winding an electrically conductive wire material. The coil 67 is placed at the inside of the yoke 621 and the yoke 622 such that the coil 67 is on the radially outer side of the tubular member 613 and the stationary core 65. The coil 67 is coaxial with the yoke 621.

The connector 69 extends from an opening formed at a portion of the yoke 621 toward the radially outer side of the yoke 621. The connector 69 includes terminals 691. Each of the terminals 691 is shaped in a rod form and is made of an electrically conductive material. One end of each terminal 691 is electrically connected to the coil 67. A harness 7 is connected to the connector 69. In this way, an electric power is supplied to the coil 67 through the harness 7 and the terminals 691.

When the electric power is supplied to the coil 67, a magnetic circuit is formed through the support 611, the yokes 621, 622, the stationary core 65 and the movable core 64 while bypassing the tubular member 613. Thus, the movable core 64 is magnetically attracted to the stationary core 65 together with the needle 63. Therefore, the suction valve 33 is moved toward the suction valve seat 32 by the urging force of the spring 34 and contacts the suction valve seat 32, so that the suction valve 33 is closed.

When the supply of the electric power to the coil 67 is stopped, the magnetic circuit is lost. Thereby, the movable core 64 is moved together with the needle 63 by the urging force of the spring 66 toward the pressurizing chamber 203. Therefore, the suction valve 33 is urged by the needle 63 toward the pressurizing chamber 203 and is thereby spaced away from the suction valve seat 32, so that the suction valve 33 is opened.

As described above, when the electric power is supplied to the electromagnetic drive device 60, the electromagnetic drive device 60 can drive the suction valve 33 of the suction valve device 30 such that the suction valve device 30 is closed. In the present embodiment, the electromagnetic drive device 60 and the suction valve device 30 form a normally open type valve device where the suction valve device 30 is opened at the time of stopping the supply of the electric power to the electromagnetic drive device 60, and the suction valve device 30 is closed at the time of supplying the electric power to the electromagnetic drive device 60.

As shown in FIG. 2, a plurality of insertion holes 106 is formed at the housing main body 11. Each of the insertion holes 106 is formed such that the insertion hole 106 connects between the one end surface and the other end surface of the housing main body 11. An axis of each insertion hole 106 is parallel to the axis Ax1 of the plunger hole 202. The number of the insertion holes 106 is two, and these insertion holes 106 are formed such that the plunger hole 202 is placed between the insertion holes 106. Specifically, the two insertion holes 106 are arranged in the circumferential direction of the plunger hole 202 at 180 degree intervals.

In the present embodiment, the housing main body 11 is fixed to an engine head 90 of the engine 2 by bolts 8, which are provided to correspond with the insertion holes 106.

An installation hole 91 and a fixation hole 92 are formed at the engine head 90. The high-pressure pump 1 is installed to the engine 2 such that the outer peripheral wall of the extended tubular portion 112 of the housing main body 11 is fitted to an inner peripheral wall of the installation hole 91. Specifically, the housing 10 is installed to the engine 2 such that the side of the plunger hole 202, which is opposite to the pressurizing chamber 203, faces the engine 2.

The bolts 8 are respectively inserted through the insertion holes 106, and one end part of each bolt 8 is threadably engaged into a corresponding one of the fixation holes 92 of the engine head 90, so that the housing main body 11 is securely held between a head of the other end part of each bolt 8 and the engine head 90 (see FIG. 2). In this way, the high-pressure pump 1 can be fixed to the engine 2.

The discharge valve device 40 is placed between the discharge outlet 13 and the pressurizing chamber 203 at the housing main body 11.

The discharge valve device 40 includes the tubular portion 41, a seat portion 42, a discharge valve (serving as a valve) 70, a stopper 80 and a spring (serving as an urging member) 45.

The tubular portion 41 is shaped in a substantially cylindrical tubular form and is made of metal, such as stainless steel. Therefore, an inner peripheral wall of the tubular portion 41 is shaped in a substantially cylindrical form. The tubular portion 41 is formed integrally with the housing main body 11 and the discharge outlet 13 in one piece such that one end part of the tubular portion 41 is connected to the pressurizing chamber 203, and the other end part of the tubular portion 41 is connected to the discharge outlet 13. The discharge passage 205 is formed at an inside of the tubular portion 41. The discharge passage 205, which is a space at the inside of the tubular portion 41, is connected to the discharge passage 130.

The seat portion 42 is formed integrally with the tubular portion 41 in one piece such that the seat portion 42 closes one end part of the tubular portion 41. The seat portion 42 includes an upstream passage 43 and a discharge valve seat (serving as a valve seat) 44.

The upstream passage 43 is formed to extend through a center of the seat portion 42 such that one end part of the upstream passage 43 is connected to the pressurizing chamber 203, and the other end part of the upstream passage 43 is connected to the discharge passage 205. Specifically, the upstream passage 43 connects between the discharge passage 205 and the pressurizing chamber 203. Therefore, the pressurizing chamber 203 can be communicated with the pipe 4 through the upstream passage 43, the discharge passage 205 and the discharge passage 130.

The discharge valve seat 44 is shaped in a ring form and is placed on a radially outer side of an opening of the upstream passage 43 at a surface of the seat portion 42 placed on the tubular portion 41 side. Specifically, the discharge valve seat 44 is formed in the ring form around the upstream passage 43. In the present embodiment, the discharge valve seat 44 is shaped in a planar ring form.

The upstream passage 43 includes a cylindrical surface 431 and a tapered surface 432. The cylindrical surface 431 is shaped in a substantially cylindrical form, and one end part of the cylindrical surface 431 is connected to the pressurizing chamber 203. The tapered surface 432 is located on a side of the cylindrical surface 431, which is opposite to the pressurizing chamber 203. One end part of the tapered surface 432 is connected to the cylindrical surface 431, and the other end part of the tapered surface 432 is connected to an inner periphery of the discharge valve seat 44. The tapered surface 432 is tapered such that the tapered surface 432 progressively approaches an axis of the upstream passage 43 from the discharge valve seat 44 side toward the cylindrical surface 431 side (see FIG. 3).

The discharge valve 70 includes a valve main body 71, a plurality of primary passages 701 and a valve extension 73.

The valve main body 71 is shaped in a substantially circular disk form and is made of metal, such as stainless steel. The valve main body 71 is installed at an inside of the tubular portion 41 such that the outer periphery of the valve main body 71 slidably contacts the inner peripheral wall of the tubular portion 41, and axial movement of the valve main body 71 is guided by the tubular portion 41. One end surface of the valve main body 71 is configured to contact the discharge valve seat 44. An outer periphery of each of the two opposed end parts of the valve main body 71 is chamfered and is tapered.

When the valve main body 71 of the discharge valve 70 is spaced away from the discharge valve seat 44, the valve main body 71 is opened, i.e., is placed in the valve opening state. Then, when the valve main body 71 contacts the discharge valve seat 44, the valve main body 71 is closed, i.e., is placed in a valve closing state. Hereinafter, a direction of moving the valve main body 71 away from the discharge valve seat 44 for opening the valve main body 71 will be referred to as a valve opening direction. Also, a direction of moving the valve main body 71 toward the discharge valve seat 44 for closing the valve main body 71 against the discharge valve seat 44 will be referred to as a valve closing direction.

Figure 3:
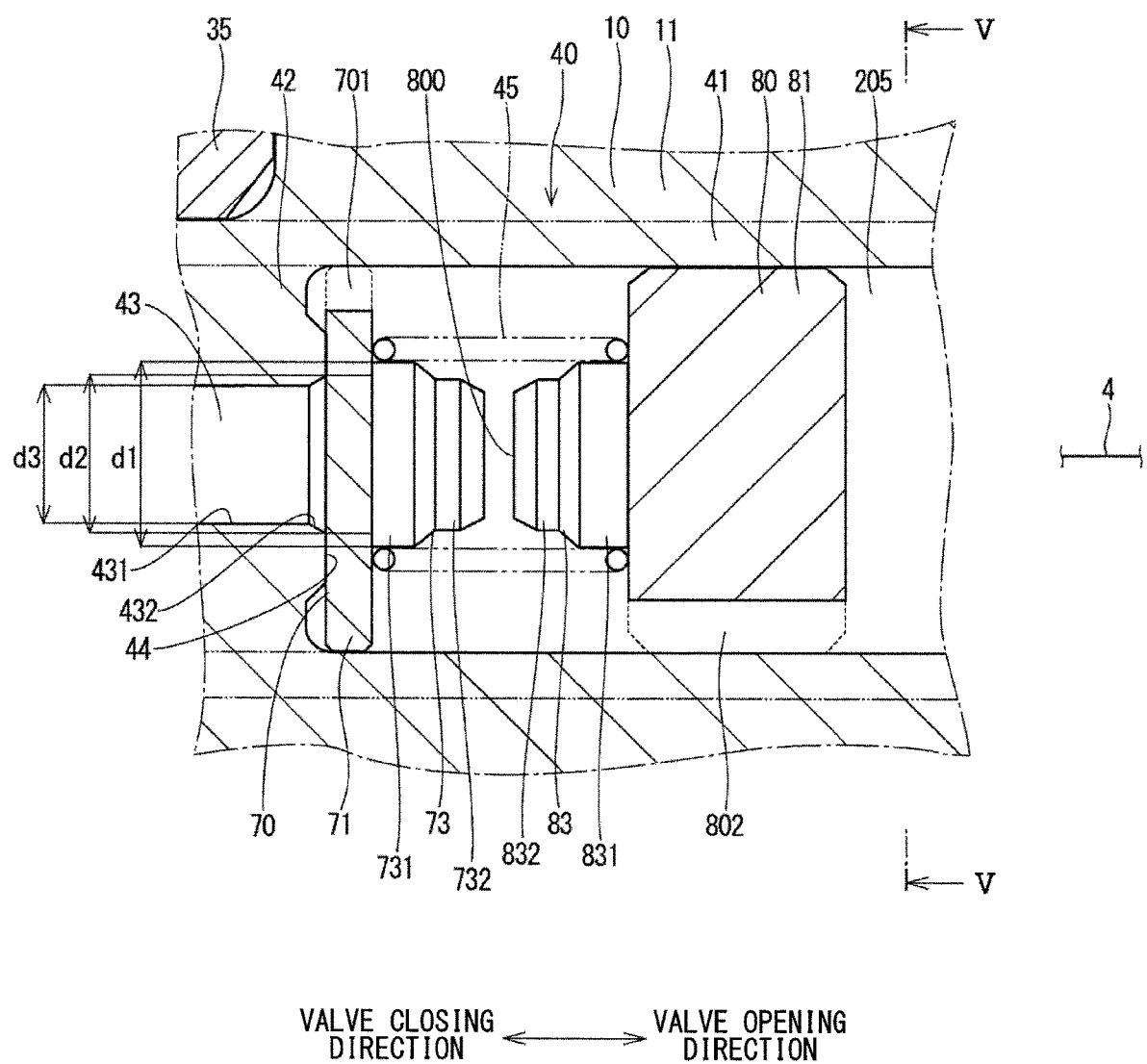
FIG. 3 is a cross-sectional view showing a discharge valve device of the high-pressure pump according to the first embodiment.
Figure 4:
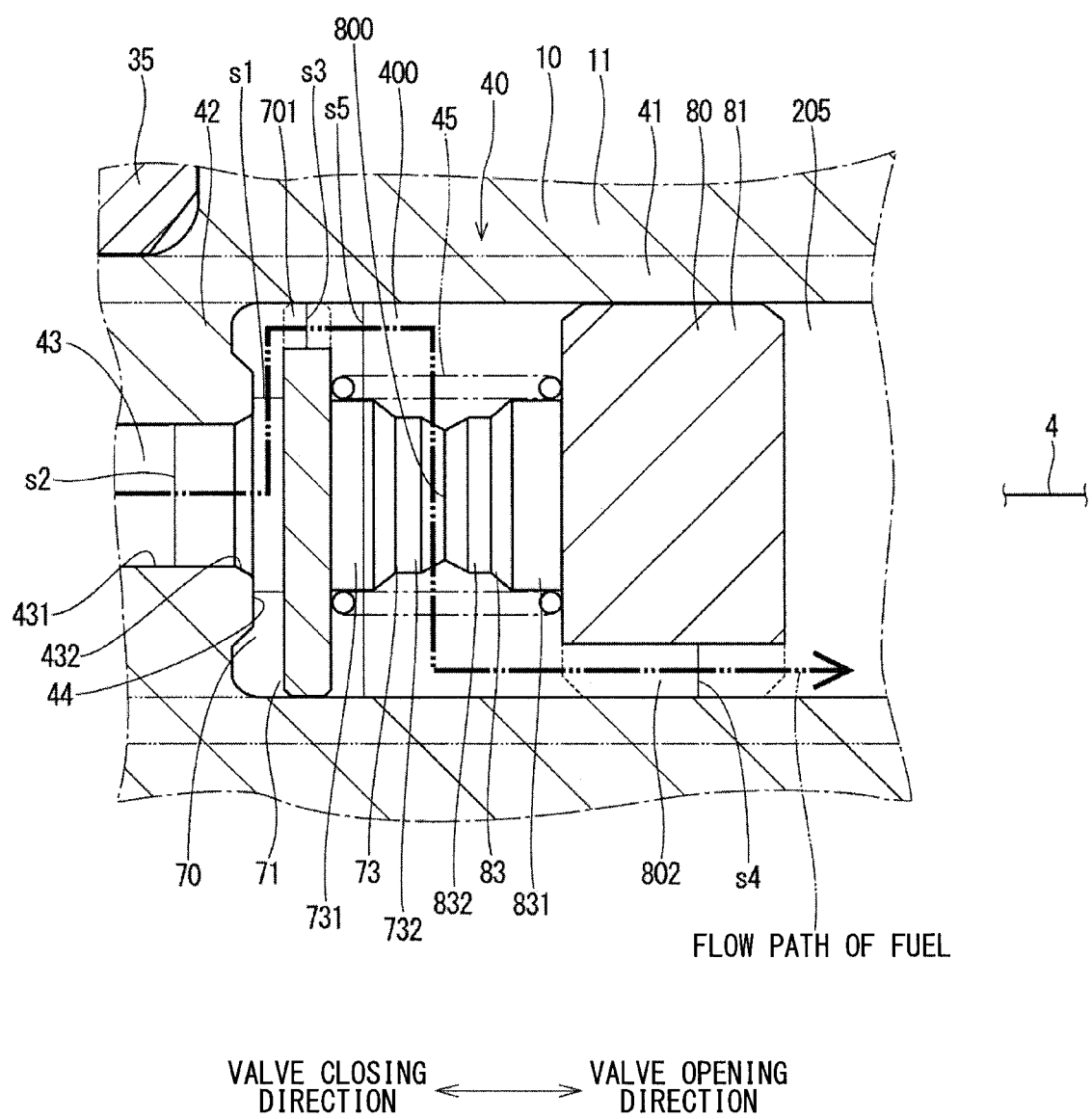
FIG. 4 is a cross-sectional view showing the discharge valve device of the high-pressure pump in a valve opening state according to the first embodiment.
Figure 5:
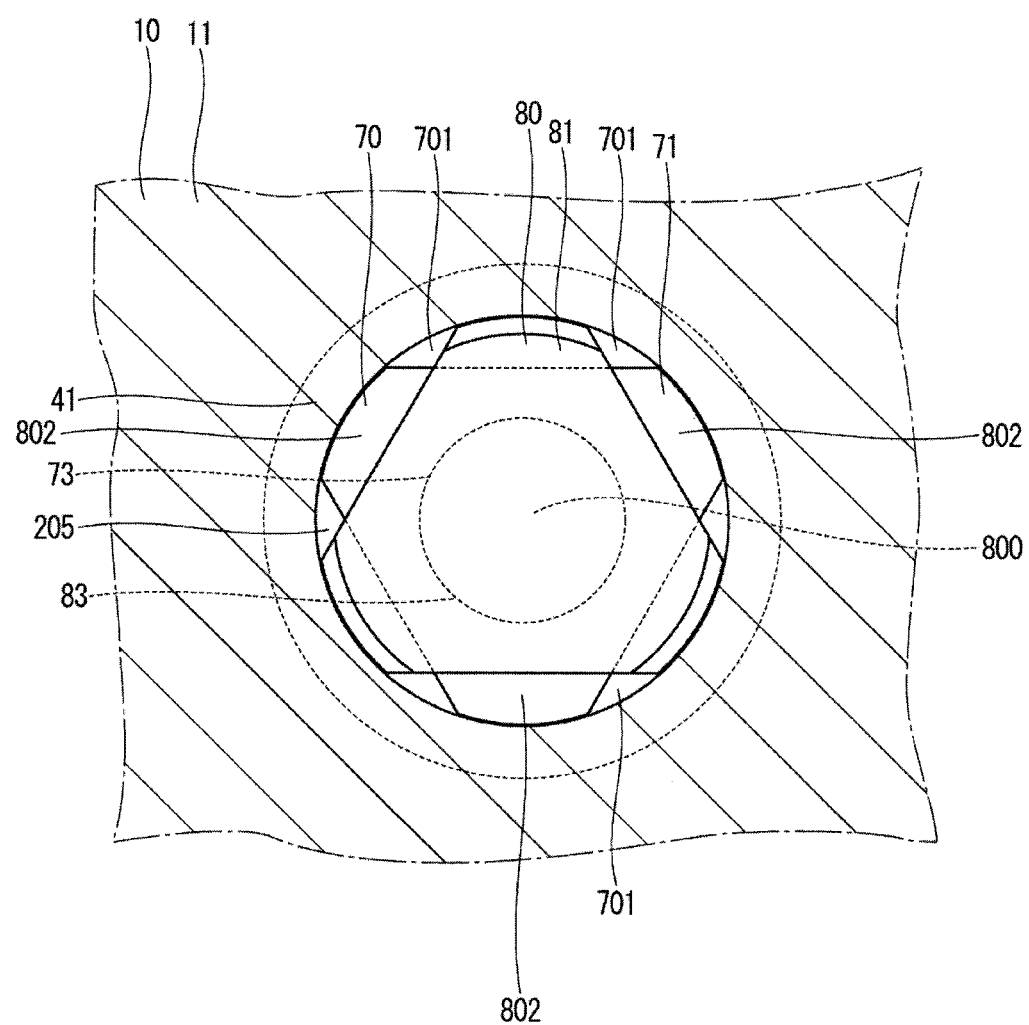
FIG. 5 is a cross-sectional view taken along line V-V in FIG. 3.

Each of the primary passages 701 is formed at the valve main body 71 and is located between the valve main body 71 and the inner peripheral wall of the tubular portion 41 (see FIGS. 3 to 5). Each of the primary passages 701 is formed by cutting, i.e., recessing a corresponding portion of the outer periphery of the valve main body 71 that is shaped in the substantially circular disk form. The number of the primary passages 701 is three, and these primary passages 701 are arranged at equal intervals in the circumferential direction of the valve main body 71 (see FIG. 5). The fuel, which is located on the discharge valve seat 44 side of the valve main body 71, can flow through the primary passages 701 to the other side of the valve main body 71, which is opposite to the discharge valve seat 44.

The valve extension 73 includes a first valve extension 731 and a second valve extension 732. The first valve extension 731 is formed integrally with the valve main body 71 in one piece such that the first valve extension 731 is shaped in a substantially cylindrical rod form and projects from a center of the end surface of the valve main body 71, which is opposite to the discharge valve seat 44, toward the side that is opposite to the discharge valve seat 44. An outer diameter of the first valve extension 731 is set to be larger than an inner diameter of the discharge valve seat 44. Here, an outer diameter of the first valve extension 731 is denoted by d1, a diameter of a boundary between the discharge valve seat 44 and the upstream passage 43 is denoted by d2. Furthermore, an inner diameter of the cylindrical surface 431 of the upstream passage 43 is denoted by d3. In such a case, the first valve extension 731, the discharge valve seat 44 and the cylindrical surface 431 are formed to satisfy a relationship of d1>d2>d3 (see FIG. 3). An inner diameter of the discharge valve seat 44 is the same as an inner diameter of the opening of the upstream passage 43 located on the discharge valve seat 44 side, i.e., the diameter d2 of the boundary between the tapered surface 432 and the discharge valve seat 44. An outer periphery of an end part of the first valve extension 731, which is opposite to the valve main body 71, is chamfered and is thereby tapered.

The second valve extension 732 is formed integrally with the first valve extension 731 in one piece such that the second valve extension 732 is shaped in a substantially cylindrical rod form and projects from a center of an end surface of the first valve extension 731, which is opposite to the valve main body 71, toward the side that is opposite to the first valve extension 731. An outer diameter of the second valve extension 732 is smaller than the outer diameter of the first valve extension 731. An outer periphery of an end part of the second valve extension 732, which is opposite to the first valve extension 731, is chamfered and is thereby tapered.

The stopper 80 includes a stopper main body 81, a movement limit surface 800, a plurality of secondary passages 802 and a stopper extension 83.

The stopper main body 81 is shaped in a substantially cylindrical rod form and is made of metal, such as stainless steel. The stopper main body 81 is made of a member that is formed separately from the tubular portion 41. That is, the stopper main body 81 is formed separately from the tubular portion 41. An outer diameter of the stopper main body 81 is set to be slightly larger than an inner diameter of the tubular portion 41. The stopper main body 81 is formed such that an outer peripheral wall of the stopper main body 81 is fitted to an inner peripheral wall of the tubular portion 41 on the side of the discharge valve 70, which is opposite to the discharge valve seat 44 such that the stopper main body 81 is coaxial with the tubular portion 41. The stopper main body 81 is placed such that the stopper main body 81 is immovable relative to the tubular portion 41 in the axial direction. Thereby, the stopper 80 is arranged such that the stopper main body 81 is supported by the inner peripheral wall of the tubular portion 41. An outer periphery of each of two opposite end parts of the stopper main body 81 is chamfered and is tapered.

Each of the secondary passages 802 is formed between the stopper main body 81 and the inner peripheral wall of the tubular portion 41 (see FIGS. 3 to 5). Each of the secondary passages 802 is formed by cutting a corresponding portion of the outer periphery of the stopper main body 81 that is shaped in the substantially cylindrical rod form. The number of the secondary passages 802 is three, and these secondary passages 802 are arranged at equal intervals in the circumferential direction of the stopper main body 81 (see FIG. 5). The fuel, which is located on the discharge valve 70 side of the stopper main body 81, can flow through the secondary passages 802 to the other side of the stopper main body 81, which is opposite to the discharge valve 70.

The stopper extension 83 includes a first stopper extension 831 and a second stopper extension 832. The first stopper extension 831 is formed integrally with the stopper main body 81 in one piece such that the first stopper extension 831 is shaped in a substantially cylindrical rod form and projects from a center of an end surface of the stopper main body 81, which is located on the discharge valve 70 side, toward the discharge valve 70 side. An outer diameter of the first stopper extension 831 is set to be substantially the same as the outer diameter of the first valve extension 731. An outer periphery of an end part of the first stopper extension 831, which is located on the discharge valve 70 side, is chamfered and is tapered.

The second stopper extension 832 is formed integrally with the first stopper extension 831 in one piece such that the second stopper extension 832 is shaped in a substantially cylindrical rod form and projects from a center of an end surface of the first stopper extension 831, which is located on the discharge valve 70 side, toward the discharge valve 70 side. An outer diameter of the second stopper extension 832 is smaller than the outer diameter of the first stopper extension 831. An outer periphery of an end part of the second stopper extension 832, which is located on the discharge valve 70 side, is chamfered and is tapered.

The movement limit surface 800 is formed at an end surface of the second stopper extension 832 located on the discharge valve 70 side. The movement limit surface 800 can contact an end surface of the second valve extension 732 of the discharge valve 70, which is located on the stopper 80 side. The movement limit surface 800 can limit movement of the discharge valve 70 in a direction away from the discharge valve seat 44 when the movement limit surface 800 contacts the discharge valve 70. Specifically, when the end surface of the second valve extension 732, which is located on the stopper 80 side, contacts the movement limit surface 800 of the stopper 80 upon movement of the discharge valve 70 in the valve opening direction, the movement of the discharge valve 70 in the valve opening direction is limited.

Here, the primary passages 701 are located on the discharge valve seat 44 side of the movement limit surface 800. The secondary passages 802 are placed on the side of the movement limit surface 800, which is opposite to the discharge valve seat 44.

In the present embodiment, when the end surface of the second valve extension 732 of the discharge valve 70, which is located on the stopper 80 side, contacts the movement limit surface 800 of the stopper 80, an annular passage 400, which is a passage shaped in an annular form and is located between the primary passages 701 and the secondary passages 802, is formed (see FIG. 4). Here, the annular passage 400 is formed around the valve extension 73 and the stopper extension 83, i.e., is formed on the radially outer side of the valve extension 73 and the stopper extension 83. In the state where the discharge valve 70 is opened and contacts the movement limit surface 800, the fuel in the pressurizing chamber 203 can flow toward the side of the stopper 80, which is opposite to the discharge valve 70, through the upstream passage 43, the passage between the discharge valve seat 44 and the discharge valve 70, the primary passages 701, the annular passage 400 and the secondary passages 802 (see FIG. 4). Here, the annular passage 400 serves as a passage.

In the present embodiment, the discharge valve 70 is configured to rotate in the circumferential direction relative to the tubular portion 41. Therefore, as shown in FIG. 5, in a view of the discharge valve 70 and the stopper 80 seen in the axial direction, there may be a case where the primary passages 701 are partially closed by the stopper main body 81 while the secondary passages 802 are partially closed by the valve main body 71. However, in the present embodiment, when the discharge valve 70 contacts the movement limit surface 800, the annular passage 400 is formed between the primary passages 701 and the secondary passages 802. Therefore, it is possible to limit a reduction of the flow rate of the fuel that passes through the primary passages 701 and the secondary passages 802.

The spring 45 is, for example, a coil spring and is placed between the discharge valve 70 and the stopper 80. One end part of the spring 45 contacts the end surface of the valve main body 71, which is located on the stopper 80 side, and the other end part of the spring 45 contacts the end surface of the stopper main body 81, which is located on the discharge valve 70 side. The spring 45 urges the discharge valve 70 toward the discharge valve seat 44, so that the valve main body 71 of the discharge valve 70 is urged against the discharge valve seat 44. The spring 45 can be placed in the annular passage 400 (see FIG. 4). Therefore, when the annular passage 400 is formed, the fuel can flow around the spring 45.

Furthermore, an inner peripheral surface of the one end part of the spring 45 is configured to contact an outer peripheral surface of the first valve extension 731, and an inner peripheral surface of the other end part of the spring 45 is configured to contact an outer peripheral surface of the first stopper extension 831. Therefore, radial movement of the one end part of the spring 45 relative to the discharge valve 70 is limited by the first valve extension 731, and radial movement of the other end part of the spring 45 relative to the stopper 80 is limited by the first stopper extension 831. In this way, the position of the spring 45 relative to the discharge valve 70 and the stopper 80 is stabilized at the time of reciprocating the discharge valve 70 in the axial direction and at the time of conducting the fuel through the annular passage 400. Thereby, the accuracy of the valve opening/closing of the discharge valve 70 can be improved.

When a pressure of the fuel in the space located on the pressurizing chamber 203 side of the discharge valve seat 44 becomes larger than a sum (a valve opening pressure of the discharge valve device 40) of the pressure of the fuel in the space located on the pipe 4 side of the discharge valve seat 44 and the urging force of the spring 45, the discharge valve 70 is moved away from the discharge valve seat 44 and is thereby opened. In this way, the fuel on the pressurizing chamber 203 side of the discharge valve seat 44 is discharged toward the pipe 4 through the upstream passage 43, the discharge valve seat 44, the primary passages 701, the annular passage 400, the secondary passages 802 and the discharge passage 130. The valve opening pressure of the discharge valve device 40 can be set by adjusting the urging force of the spring 45 through, for example, adjustment of the axial position of the stopper 80 relative to the tubular portion 41.

The discharge valve device 40 enables or limits the flow of the fuel between the pressurizing chamber 203 side of the discharge passage 205 and the other side of the discharge passage 205, which is opposite to the pressurizing chamber 203, at the valve opening time or the valve closing time of the discharge valve device 40.

Furthermore, in the present embodiment, the end surface of the second valve extension 732 and the movement limit surface 800 formed at the end surface of the second stopper extension 832 are configured to contact with each other, so that the contact surface area can be reduced in comparison to a structure in which the second valve extension 732 and the second stopper extension 832 are not formed. Thus, it is possible to reduce a linking force, which is generated at the time of lifting the discharge valve 70, which has been in contact with the movement limit surface 800 of the stopper 80. Here, the linking force is a force that interferes separation of two members.

Furthermore, the outer periphery of the end part of the first valve extension 731, which is located on the stopper 80 side, is chamfered and is tapered, and the outer periphery of the end part of the first stopper extension 831, which is located on the discharge valve 70 side, is chamfered and is tapered. Therefore, the end part of the first valve extension 731 and the end part of the first stopper extension 831 can be limited from being caught by the inner peripheral surface of the spring 45.

Furthermore, in the present embodiment, the tubular portion 41, the seat portion 42 and the housing main body 11 are formed integrally in one piece. Therefore, the discharge valve device 40 can be provided to the high-pressure pump 1 by inserting the discharge valve 70 and the spring 45 into the inside of the tubular portion 41 and fitting the stopper 80 to the inner peripheral wall of the tubular portion 41. Thus, it is not required to form the discharge valve device 40 as a sub-assembly, and the structure around the discharge valve device 40 can be simplified.

Furthermore, since the tubular portion 41 and the seat portion 42 are formed integrally in one piece, the coaxiallity between the discharge valve seat 44 and the discharge valve 70 can be easily maintained. Thus, the accuracy of the valve opening/closing of the discharge valve 70 can be further improved. Furthermore, the tubular portion 41 and the seat portion 42 can be made from the material having a high rigidity, so that wearing of the tubular portion 41 and the seat portion 42 can be limited.

Furthermore, an inner diameter of a portion of the inner peripheral wall of the tubular portion 41, which slidably contacts the outer periphery of the discharge valve 70, is the same as an inner diameter of another portion of the inner peripheral wall of the tubular portion 41, which supports the stopper 80. Therefore, it is possible to implement the discharge valve device 40, which is compact in the radial direction.

Furthermore, in the present embodiment, there is no need to provide a portion or a member that limits rotation of the discharge valve 70 relative to the tubular portion 41. Therefore, the structure of the discharge valve device 40 can be simplified.

Here, a maximum passage cross-sectional area of the passage between the valve main body 71 and the discharge valve seat 44 is denoted by s1, and a minimum passage cross-sectional area of the upstream passage 43 is denoted by s2. Furthermore, a passage cross-sectional area of the primary passages 701 is denoted by s3, and a passage cross-sectional area of the secondary passages 802 is denoted by s4. Also, a minimum passage cross-sectional area of the annular passage 400 is denoted by s5. In such a case, the seat portion 42, the discharge valve 70 and the stopper 80 are formed to satisfy a relationship of s1≤s2, s3, s4, s5 (see FIG. 4). By reducing only the cross-sectional area of the passage between the valve main body 71 and the discharge valve seat 44 in the above described manner, the reciprocation of the discharge valve 70 in the axial direction can be stabilized.

Next, an operation of the high-pressure pump 1 will be described with reference to FIGS. 1 and 2.

(Suction Stroke)

In a state where the supply of the electric power to the coil 67 of the electromagnetic drive device 60 is stopped, the suction valve 33 is urged toward the pressurizing chamber 203 by the spring 66 and the needle 63. Therefore, the suction valve 33 is spaced away from the suction valve seat 32, i.e., is opened. In this state, when the plunger 50 is moved toward the cam 5, i.e., in the counter-pressurization direction, the volume of the pressurizing chamber 203 is increased. Thus, the fuel, which is located on the side of the suction valve seat 32 of the suction passage 204, which is opposite to the pressurizing chamber 203, is moved to the other side of the suction valve seat 32 where the pressurizing chamber 203 is located, and then the fuel is drawn into the pressurizing chamber 203. Furthermore, at this time, the volume of the variable volume chamber 209 is reduced.

In the suction stroke, the fuel of the inflow port 201 can flow into the inflow-side upper passages 211, and the fuel in the inflow-side upper passages 211 can flow into the suction passage 204. Furthermore, the fuel in the suction passage 204 can flow into the pressurizing chamber 203, and the fuel in the fuel reservoir 207 can flow into the inflow-side lower passage 212, the damper-side lower passages 222 and the connection passage 231. Also, the fuel in the damper-side upper passages 221 and the connection passage 231 can flow into the suction passage 204, and the fuel in the variable volume chamber 209 can flow into the fuel reservoir 207.

(Metering Stroke)

In the valve opening state of the suction valve 33, when the plunger 50 is moved toward the side that is opposite to the cam 5, i.e., in the pressurization direction, the volume of the pressurizing chamber 203 is reduced, and the fuel in the pressurizing chamber 203 is returned to the side of the suction valve seat 32 of the suction passage 204, which is opposite to the pressurizing chamber 203. When the electric power is supplied to the coil 67 in the middle of the metering stroke, the movable core 64 is attracted to the stationary core 65 together with the needle 63, so that the suction valve 33 contacts the suction valve seat 32 and is thereby closed. The amount of fuel, which is returned from the pressurizing chamber 203 to the suction passage 204, is adjusted by adjusting the timing of closing the suction valve 33 at the time of moving the plunger 50 in the pressurization direction. As a result, the amount of fuel pressurized in the pressurizing chamber 203 is determined. The metering stroke, during which the fuel is returned from the pressurizing chamber 203 to the suction passage 204, ends when the suction valve 33 is closed.

In the metering stroke, the fuel in the pressurizing chamber 203 can outflow to the suction passage 204, and the fuel in the suction passage 204 can outflow to the inflow-side upper passages 211, the damper-side upper passages 221 and the connection passage 231. Furthermore, the fuel in the inflow-side lower passage 212, the damper-side lower passages 222 and the connection passage 231 can outflow to the fuel reservoir 207, and the fuel in the fuel reservoir 207 can outflow to the variable volume chamber 209.

(Pressurizing Stroke)

When the plunger 50 is moved further in the pressurization direction in the state where the suction valve 33 is closed, the volume of the pressurizing chamber 203 is reduced, and the fuel in the pressurizing chamber 203 is compressed and is pressurized. When the pressure of the fuel in the pressurizing chamber 203 becomes equal to or larger than the valve opening pressure of the discharge valve device 40, the discharge valve 70 is opened. Therefore, the fuel flows from the pressurizing chamber 203 toward the pipe 4, i.e., toward the fuel rail through the upstream passage 43, the discharge passage 205 and the discharge passage 130.

When the supply of the electric power to the coil 67 is stopped, the plunger 50 is moved in the counter-pressurization direction. Thus, the suction valve 33 opens once again. In this way, the pressurizing stroke for pressurizing the fuel ends, and the suction stroke for suctioning the fuel from the suction passage 204 into the pressurizing chamber 203 starts once again.

By repeating the suction stroke, the metering stroke and the pressurizing stroke discussed above, the suctioned fuel is pressurized and is discharged by the high-pressure pump 1 to supply the pressurized fuel to the fuel rail. The amount of fuel supplied from the high-pressure pump 1 to the fuel rail is adjusted by controlling, for example, the timing of supplying the electric power to the coil 67 of the electromagnetic drive device 60.

When the plunger 50 is reciprocated in the state where the suction valve 33 is opened during, for example, the suction stroke or the metering stroke, pressure pulsation of the fuel may possibly occur in the damper chamber 208. The pulsation damper 16, which is installed in the damper chamber 208, is resiliently deformed in response to a change in the fuel pressure in the damper chamber 208, so that the pulsation damper 16 can damp the pressure pulsation of the fuel in the damper chamber 208.

Furthermore, in the state where the high-pressure pump 1 continues the discharge of the fuel to the fuel rail side, the fuel, which flows from the inlet 12 into the inflow port 201, flows into the pressurizing chamber 203 through the inflow-side upper passages 211 and the suction passage 204. The fuel, which flows from the inlet 12 into the inflow port 201, flows to the fuel reservoir 207 through the inflow-side lower passage 212. Furthermore, when the plunger 50 reciprocates, the volume of the variable volume chamber 209 increases and decreases. Therefore, at this time, the fuel flows back and forth between the fuel reservoir 207 and the variable volume chamber 209. In this way, the housing main body 11 and the plunger 50, which is heated to have a high temperature by the heat generated though the slide movement between the plunger 50 and the inner peripheral wall of the plunger hole 202 of the housing main body 11, the heat generated through the pressurization of the fuel in the pressurizing chamber 203 and the heat generated from the engine 2, can be cooled with the low temperature fuel. In this way, galling of the plunger 50 and the inner peripheral wall of the plunger hole 202 of the housing main body 11 can be limited.

Furthermore, a portion of the fuel, which is pressurized to the high pressure in the pressurizing chamber 203, can flow into the variable volume chamber 209 through a clearance between the plunger 50 and the inner peripheral wall of the plunger hole 202 of the housing main body 11. In this way, an oil film is formed between the plunger 50 and the inner peripheral wall of the plunger hole 202, so that the galling of the plunger 50 and the inner peripheral wall of the plunger hole 202 can be effectively limited. The fuel, which flows from the pressurizing chamber 203 into the variable volume chamber 209, can flow into the pressurizing chamber 203 once again through the fuel reservoir 207, the inflow-side lower passage 212, the inflow port 201, the inflow-side upper passages 211, the damper-side lower passages 222, the damper-side upper passages 221, the connection passage 231 and the suction passage 204.

In the present embodiment, when the pressure of the pressurizing chamber 203 becomes equal to or larger than the valve opening pressure of the discharge valve device 40, the discharge valve device 40 is opened. Thus, the fuel of the pressurizing chamber 203 can outflow to the pipe 4 side through the upstream passage 43, the discharge valve seat 44, the primary passages 701, the passage between the discharge valve 70 and the stopper 80, the secondary passages 802 and the discharge passage 130. When the discharge valve 70 contacts the movement limit surface 800, the annular passage 400 is formed between the primary passages 701 and the secondary passages 802, and, thereby, the fuel can flow to the pipe 4 side through the primary passages 701, the annular passage 400 and the secondary passages 802 (see FIG. 4).

Furthermore, when the discharge valve 70 is reciprocated at the inside of the tubular portion 41, the outer periphery of the valve main body 71 slidably contacts the inner peripheral wall of the tubular portion 41 through the outer periphery of the valve main body 71 such that axial movement of the valve main body 71 is guided by the inner peripheral wall of the tubular portion 41.

As described above, the high-pressure pump 1 of the present embodiment includes the housing 10, the tubular portion 41, the seat portion 42, the discharge valve (serving as the valve) 70 and the stopper 80.

The housing 10 includes the pressurizing chamber 203, which is configured to pressurize the fuel in the pressurizing chamber 203.

The tubular portion 41 forms the discharge passage 205, which is configured to conduct the fuel discharged from the pressurizing chamber 203.

The seat portion 42 includes: the upstream passage 43, which connects between the discharge passage 205 and the pressurizing chamber 203; and the discharge valve seat 44, which is formed on the side of the upstream passage 43 where the discharge passage 205 is located.

The discharge valve 70 includes: the valve main body 71 that slidably contacts the inner peripheral wall of the tubular portion 41 through the outer periphery of the valve main body 71 such that movement of the valve main body 71 in the axial direction is guided by the inner peripheral wall of the tubular portion 41 while the valve main body 71 is configured to contact the discharge valve seat 44; and the primary passages 701 that are formed at the valve main body 71 and are located between the valve main body 71 and the inner peripheral wall of the tubular portion 41 while the primary passages 701 are configured to conduct the fuel from the one side of the valve main body 71, at which the discharge valve seat 44 is located, to the other side of the valve main body 71, which is opposite to the discharge valve seat 44.

The stopper 80 includes: the stopper main body 81 that is the member, which is formed separately from the tubular portion 41 while the stopper main body 81 is placed on the other side of the discharge valve 70 that is opposite to the discharge valve seat 44; the movement limit surface 800 that is configured to limit the movement of the discharge valve 70 in the direction away from the discharge valve seat 44; and the secondary passages 802 that are formed at the stopper main body 81 and are configured to conduct the fuel from the one side of the stopper main body 81, at which the discharge valve 70 is located, to the other side of the stopper main body 81, which is opposite to the discharge valve 70.

The primary passages 701 are located on the discharge valve seat 44 side of the movement limit surface 800.

The secondary passages 802 are placed on the side of the movement limit surface 800, which is opposite to the discharge valve seat 44.

In the present embodiment, the valve main body 71 slidably contacts the inner peripheral wall of the tubular portion 41 through the outer periphery of the valve main body 71 such that the axial movement of the valve main body 71 is guided by the inner peripheral wall of the tubular portion 41. The primary passages 701 are configured to conduct the fuel from the discharge valve seat 44 side of the valve main body 71 to the other side of the valve main body 71 that is opposite to the discharge valve seat 44, and the primary passages 701 are formed at the valve main body 71 and are located between the valve main body 71 and the inner peripheral wall of the tubular portion 41. The stopper 80 is made of the member that is formed separately from the tubular portion 41. As described above, the tubular portion 41 is formed separately from the stopper 80, and the primary passages 701 are not formed at the tubular portion 41. Therefore, the configuration of the tubular portion 41 can be simplified. Furthermore, the primary passages 701 are not formed in the tubular portion 41 but are formed at the valve main body 71 of the discharge valve 70 at the location between the valve main body 71 and the inner peripheral wall of the tubular portion 41, so that the radial size of the tubular portion 41 can be reduced.

Furthermore, in the present embodiment, when the discharge valve 70 contacts the movement limit surface 800, the annular passage 400 is formed between the primary passages 701 and the secondary passages 802.

In the present embodiment, when the discharge valve 70 contacts the movement limit surface 800, the flow of the fuel between the primary passages 701 and the secondary passages 802 may possibly be blocked or interfered depending on the positional relationship between the primary passages 701 and the secondary passages 802. However, in the present embodiment, when the discharge valve 70 contacts the movement limit surface 800, the annular passage 400 is formed between the primary passages 701 and the secondary passages 802. Therefore, even when the movement of the discharge valve 70 is limited by the stopper 80, the fuel can flow between the primary passages 701 and the secondary passages 802.

Furthermore, in the present embodiment, the annular passage 400, which is formed between the primary passages 701 and the secondary passages 802, is a passage that is shaped in an annular form. Therefore, the fuel can be smoothly conducted through the annular passage 400.

In the present embodiment, the discharge valve 70 further includes the valve extension 73 that extends from the valve main body 71 toward the stopper 80. The annular passage 400 is formed on the outside of the valve extension 73 when the valve extension 73 contacts the movement limit surface 800. In the present embodiment, since the discharge valve 70 includes the valve extension 73, the annular passage 400 is formed around the valve extension 73.

Furthermore, in the present embodiment, the valve main body 71 is shaped in the circular disk form. Therefore, the amount of flexure of the valve main body 71 may possibly be increased when the high back pressure is applied to a portion of the end surface of the valve main body 71, which is located on the pressurizing chamber 203 side and corresponds to the inside of the discharge valve seat 44. However, in the present embodiment, the discharge valve 70 includes the valve extension 73, which extends from the center of the valve main body 71 toward the stopper 80. Therefore, even when the high back pressure is applied to the end surface of the valve main body 71, which is located on the pressurizing chamber 203 side, the amount of flexure of the valve main body 71 can be limited.

Furthermore, in the present embodiment, there is provided the spring 45, which can urge the discharge valve 70 toward the discharge valve seat 44. The inner peripheral surface of the one end part of the spring 45 is configured to contact the outer peripheral wall of the first valve extension 731 of the valve extension 73. Therefore, the radial movement of the one end part of the spring 45 relative to the discharge valve 70 is limited by the first valve extension 731. In this way, the position of the spring 45 relative to the discharge valve 70 is stabilized at the time of reciprocating the discharge valve 70 in the axial direction and at the time of conducting the fuel through the annular passage 400. Thereby, the accuracy of the valve opening/closing of the discharge valve 70 can be improved.

Furthermore, in the present embodiment, the valve main body 71 is shaped in the circular disk form. Therefore, the configuration of the valve main body 71 can be simplified, and thereby the manufacturing can be eased, and the durability can be improved. Furthermore, the outer diameter d1 of the first valve extension 731 of the valve extension 73 is larger than the diameter of the upstream passage 43, i.e., the diameter d2 of the boundary between the discharge valve seat 44 and the upstream passage 43. Therefore, even when the high back pressure is applied to the portion of the end surface of the valve main body 71, which is located on the pressurizing chamber 203 side and corresponds to the inside of the discharge valve seat 44, the amount of flexure of the valve main body 71, which is shaped in the circular disk form, can be reliably limited. In this way, the fatigue failure, which is caused by the repeated flexing of the valve main body 71, and the wearing between the valve main body 71 and the discharge valve seat 44 can be limited. Thus, it is possible to implement the discharge valve 70, which can withstand the high pressure.

Furthermore, in the present embodiment, the stopper 80 includes the stopper extension 83, which extends from the stopper main body 81 toward the discharge valve 70 and has the movement limit surface 800 at the distal end part of the stopper extension 83. The annular passage 400 is formed at the outside of the stopper extension 83 when the discharge valve 70 contacts the movement limit surface 800. In the present embodiment, since the stopper 80 includes the stopper extension 83, the annular passage 400 is formed around the stopper extension 83.

Furthermore, in the present embodiment, the inner peripheral surface of the other end part of the spring 45 is configured to contact the outer peripheral wall of the first stopper extension 831 of the stopper extension 83. Therefore, the radial movement of the other end part of the spring 45 relative to the stopper 80 is limited by the first stopper extension 831. In this way, the position of the spring 45 relative to the stopper 80 is stabilized at the time of reciprocating the discharge valve 70 in the axial direction and at the time of conducting the fuel through the annular passage 400. Thereby, the accuracy of the valve opening/closing of the discharge valve 70 can be improved.

Furthermore, in the present embodiment, the stopper 80 is arranged such that the stopper main body 81 is supported by the inner peripheral wall of the tubular portion 41. Thus, there is no need to provide another member, which supports the stopper 80, in addition to the tubular portion 41. Therefore, the structure of the discharge valve device 40 can be simplified.

Furthermore, in the present embodiment, the outer periphery of the discharge valve 70 slides relative to the tubular portion 41. Each of the primary passages 701 is formed as a recess that is radially inwardly recessed from the outer periphery of the discharge valve 70. In this way, the discharge valve 70 is guided by the tubular portion 41. Therefore, at the time of opening of the discharge valve 70, the movement of the discharge valve 70 is stabilized. Furthermore, since the discharge valve 70 needs to be guided, the outer diameter of the discharge valve 70 needs to be equal to or larger than the outer diameter of the outer periphery of the discharge valve 70, which is a portion to be guided. Here, each of the primary passages 701 is formed as the recess that is recessed toward the radially inner side of the discharge valve 70, so that the outer diameter of the discharge valve 70 is not increased. Therefore, the primary passages 701 can be formed while implementing the small size of the discharge valve 70.

Furthermore, in the present embodiment, the secondary passages 802 are located on the radially outer side of the movement limit surface 800. In a comparative case where the secondary passages 802 are formed on a radially inner side of the outer periphery of the movement limit surface 800, the secondary passages 802 may possibly be closed when the movement of the discharge valve 70 is limited by the stopper 80. Also, in such a case, in order to ensure the presence of the secondary passages 802, the structure may be complicated. In contrast, according to the present embodiment, the secondary passages 802 are located on the radially outer side of the movement limit surface 800. Therefore, it is possible to communicate between the primary passages 701 and the secondary passages 802 when the discharge valve 70 contacts the movement limit surface 800.

Furthermore, in the present embodiment, the tubular portion 41 is formed integrally in one piece with the housing main body 11, which forms the pressurizing chamber 203. Thus, the number of the components can be reduced. Thereby, the structure of the high-pressure pump 1, which includes the discharge valve device 40, can be simplified, and the size of the high-pressure pump 1 can be made small.

The high-pressure pump 1 of the present embodiment includes the housing 10, the seat portion 42 and the discharge valve (serving as the valve) 70.

The housing 10 includes the pressurizing chamber 203, which is configured to pressurize the fuel in the pressurizing chamber 203.

The seat portion 42 includes: the upstream passage 43, which is connected to the pressurizing chamber 203; and the discharge valve seat 44, which is formed on the side of the upstream passage 43 that is opposite to the pressurizing chamber 203.

The discharge valve 70 is configured to contact the discharge valve seat 44.

The discharge valve 70 includes the valve extension 73 that extends toward the side that is opposite to the seat portion 42.

The discharge valve 70 is shaped in the circular disk form.

The outer diameter of the first valve extension 731 of the valve extension 73 is larger than the diameter of the upstream passage 43, i.e., the diameter of the boundary between the discharge valve seat 44 and the upstream passage 43.

In the present embodiment, since the discharge valve 70 includes the valve extension 73, the annular passage 400 is formed at the outside of the valve extension 73.

Furthermore, in the present embodiment, the discharge valve 70 is shaped in the circular disk form. Therefore, the amount of flexure of the discharge valve 70 may possibly be increased when the high back pressure is applied to the portion of the end surface of the discharge valve 70, which is located on the pressurizing chamber 203 side and corresponds to the inside of the discharge valve seat 44. However, in the present embodiment, the discharge valve 70 includes the valve extension 73, which extends toward the stopper 80. Therefore, even when the high back pressure is applied to the end surface of the discharge valve 70, which is located on the pressurizing chamber 203 side, the amount of flexure of the discharge valve 70 can be limited.

Furthermore, in the present embodiment, the discharge valve 70 is shaped in the circular disk form. Therefore, the configuration of the discharge valve 70 can be simplified, and thereby the manufacturing can be eased, and the durability can be improved. Furthermore, the outer diameter d1 of the first valve extension 731 of the valve extension 73 is larger than the diameter d2 of the boundary between the discharge valve seat 44 and the upstream passage 43. Therefore, even when the high back pressure is applied to the portion of the end surface of the discharge valve 70, which is located on the pressurizing chamber 203 side and corresponds to the inside of the discharge valve seat 44, the amount of flexure of the discharge valve 70, which is shaped in the circular disk form, can be reliably limited. In this way, the fatigue failure, which is caused by the repeated flexing of the discharge valve 70, and the wearing between the discharge valve 70 and the discharge valve seat 44 can be limited. Thus, it is possible to implement the discharge valve 70, which can withstand the high pressure.

Second Embodiment

Figure 6:
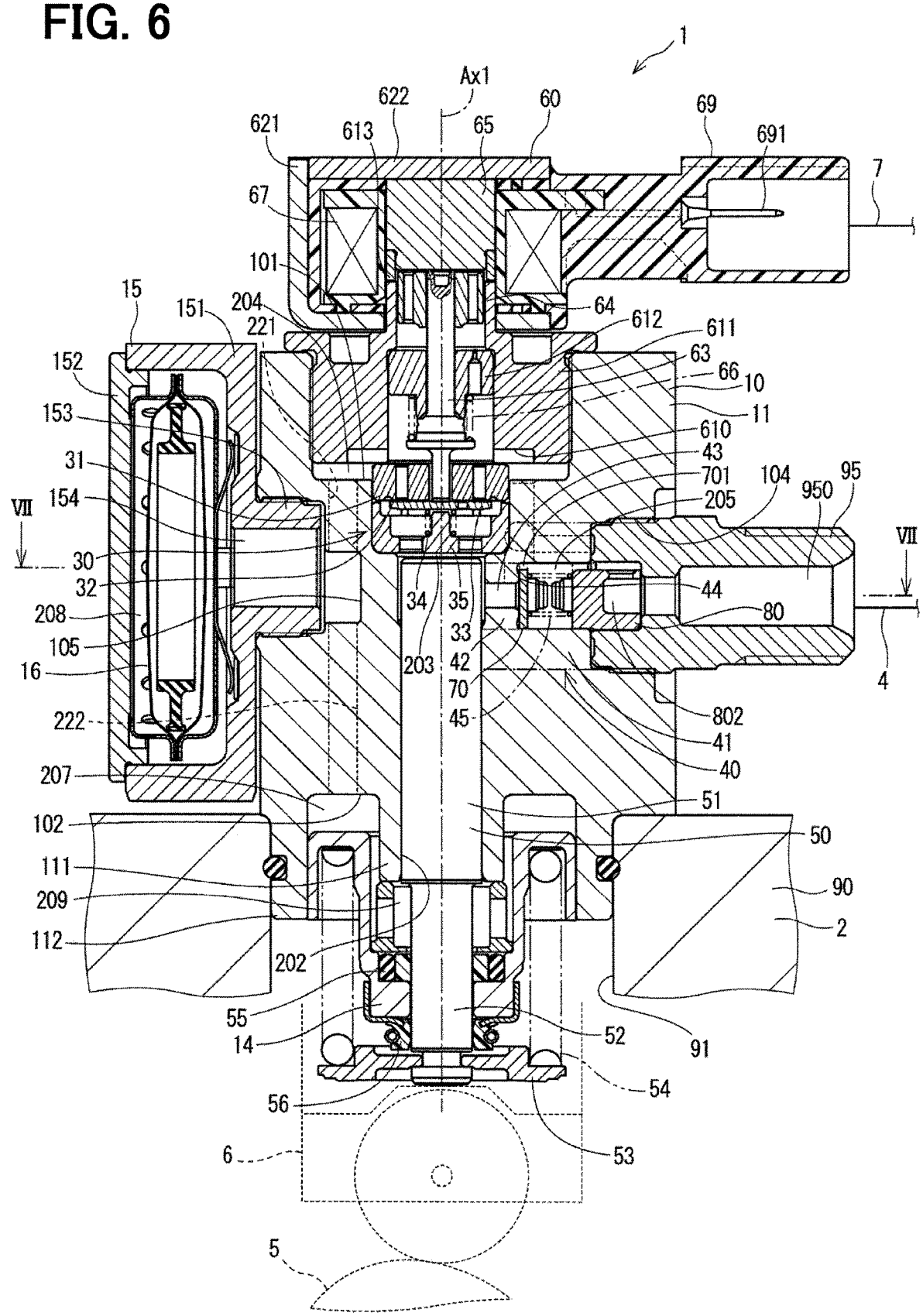
FIG. 6 is a cross-sectional view showing a high-pressure pump according to a second embodiment.
Figure 7:
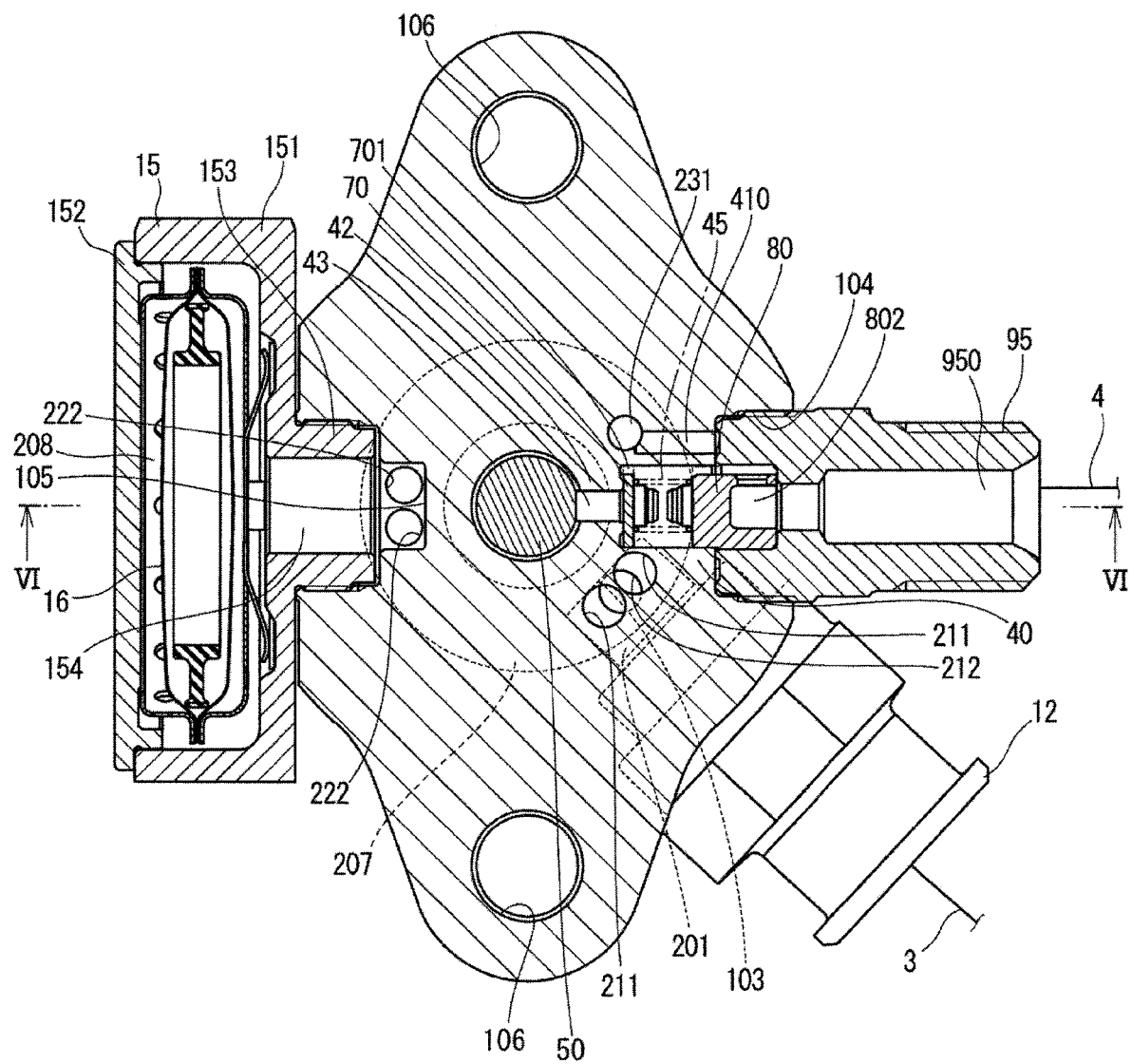
FIG. 7 is a cross-sectional view taken along line VII-VII in FIG. 6.

FIGS. 6 and 7 show a high-pressure pump according to a second embodiment. The second embodiment differs from the first embodiment with respect to the configuration of the discharge valve device 40.

In the second embodiment, the housing 10 does not include the discharge outlet 13 discussed in the first embodiment. In contrast, the housing main body 11 further includes a discharge recess 104. The discharge recess 104 is formed such that the discharge recess 104 is in a circular form and is recessed from the peripheral wall of the housing main body 11, which is located between the one end surface and the other end surface of the housing main body 11, toward the center of the housing main body 11.

The discharge recess 104 and the damper recess 105 are located on the upper recess 101 side of the inflow recess 103 in the axial direction of the upper recess 101. The discharge recess 104 is formed such that an axis of the discharge recess 104 is parallel to the axis of the damper recess 105 (see FIGS. 6 and 7). Specifically, the discharge recess 104 and the damper recess 105 are formed at the housing main body 11 such that the plunger hole 202 and the upper recess 101 are interposed between the discharge recess 104 and the damper recess 105.

The connection passage 231 is located between the inflow recess 103 and the damper recess 105 in the circumferential direction of the plunger hole 202 and is positioned adjacent to the discharge recess 104 (see FIG. 7).

In the present embodiment, in place of the discharge outlet 13 discussed in the first embodiment, a stopper support 95 is provided. The stopper support 95 is shaped in a substantially cylindrical tubular form and is made of metal, such as stainless steel. An outer peripheral wall of one end part of the stopper support 95 is threadably engaged with the inner wall of the discharge recess 104 of the housing main body 11. In this way, the stopper support 95 is immovable relative to the housing main body 11 in the axial direction. A discharge passage 950 is formed at an inside of the stopper support 95. One end part of the discharge passage 950 is connected to the discharge passage 205, and another end part of the discharge passage 950 is configured to connect with the pipe 4.

The stopper support 95 is made of a member that is formed separately from the tubular portion 41. The stopper support 95 is arranged such that one end part of the stopper support 95 is opposed to the end part of the tubular portion 41, which is opposite to the seat portion 42. An inner diameter of an end part of the stopper support 95, which is located on the tubular portion 41 side, is set to be slightly larger than the inner diameter of the tubular portion 41. A corner of an inner periphery of the end part of the stopper support 95, which is located on the tubular portion 41 side, is chambered, and a corner of an inner periphery of the end part of the tubular portion 41, which is located on the stopper support 95 side, is chambered.

In the present embodiment, the stopper main body 81 includes a stopper large diameter portion 811, a stopper small diameter portion 812, a stopper recess 813 and a stopper hole 814. The stopper large diameter portion 811 is shaped in a substantially cylindrical rod form. An outer diameter of the stopper large diameter portion 811 is set to be slightly larger than an inner diameter of the end part of the stopper support 95, which is located on the tubular portion 41 side. The stopper small diameter portion 812 is shaped in a substantially cylindrical rod form and is formed integrally with the stopper large diameter portion 811 in one piece such that the stopper small diameter portion 812 is located on the discharge valve 70 side of the stopper large diameter portion 811. The stopper small diameter portion 812 is coaxial with the stopper large diameter portion 811, and an outer diameter of the stopper small diameter portion 812 is set to be smaller than an outer diameter of the stopper large diameter portion 811 and the inner diameter of the tubular portion 41.

The stopper main body 81 is located on the other side of the discharge valve 70, which is opposite to the discharge valve seat 44, such that an outer peripheral wall of the stopper large diameter portion 811 is fitted to an inner peripheral wall of the end part of the stopper support 95, which is located on the tubular portion 41 side, and thereby the stopper main body 81 is coaxial with the stopper support 95. The stopper main body 81 is placed such that the stopper main body 81 is immovable relative to the stopper support 95 in the axial direction. Thereby, the stopper 80 is arranged such that the stopper main body 81 is supported by the inner peripheral wall of the stopper support 95. Specifically, the stopper support 95 supports the stopper main body 81 with the inner peripheral wall of the stopper support 95. A slight clearance, which is shaped in a tubular form, is formed between the outer peripheral wall of the stopper small diameter portion 812 and the inner peripheral wall of the tubular portion 41.

The stopper support 95 further includes a reduced diameter portion 96. The reduced diameter portion 96 is shaped in a substantially cylindrical tubular form and extends from the inner peripheral wall of the stopper support 95 toward the radially inner side. In this way, a step surface 961 is formed at the stopper 80 side of the reduced diameter portion 96. The step surface 961 is configured to contact an outer periphery of an end surface of the stopper large diameter portion 811 of the stopper 80, which is opposite to the stopper small diameter portion 812. Therefore, when the step surface 961 contacts the stopper 80, the step surface 961 can limit the movement of the stopper 80 in the valve opening direction.

Figure 8:
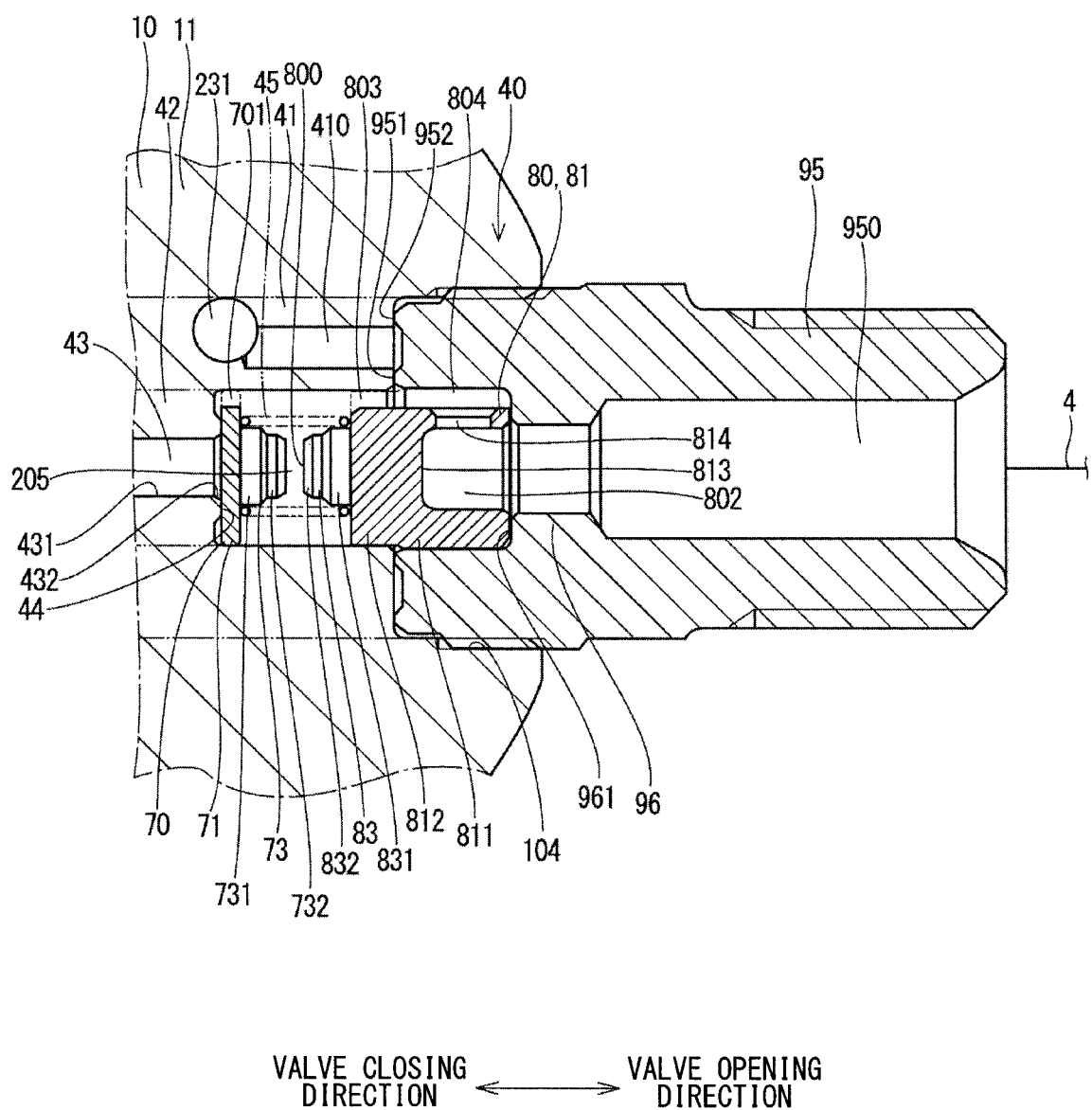
FIG. 8 is a cross-sectional view showing a discharge valve device of the high-pressure pump according to the second embodiment.
Figure 9:
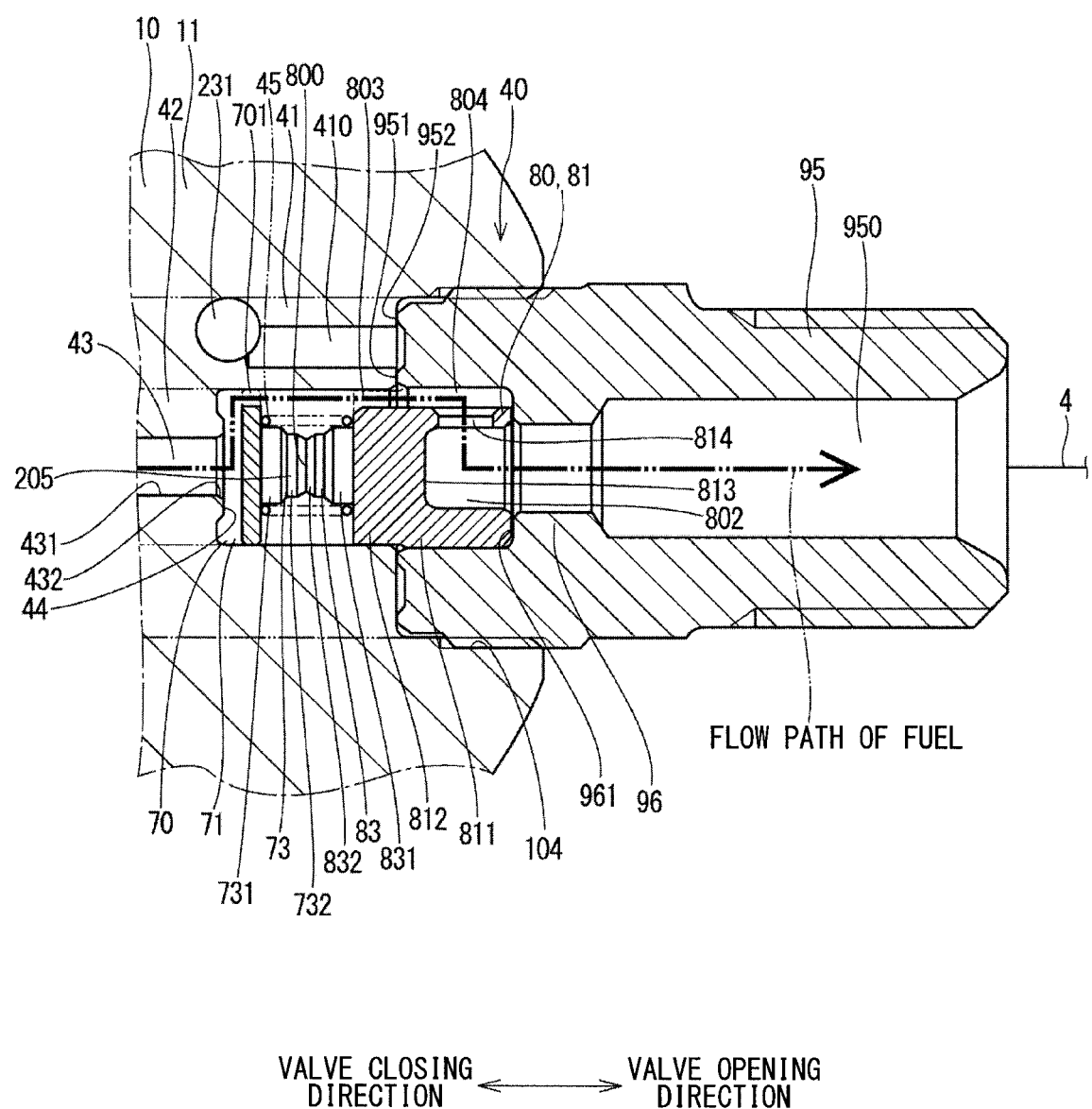
FIG. 9 is a cross-sectional view showing the discharge valve device of the high-pressure pump of the second embodiment in a valve opening state.

The stopper 80 includes a gap passage 803 and a gap passage 804. The gap passage 803 is formed at the stopper small diameter portion 812 and is located between the stopper small diameter portion 812 and the inner peripheral wall of the tubular portion 41. The gap passage 804 is formed at the stopper large diameter portion 811 and is located between the stopper large diameter portion 811 and the inner peripheral wall of the stopper support 95 (see FIGS. 8 and 9). The gap passage 803 and the gap passage 804 are connected with each other.

The stopper recess 813 is in a circular form and is recessed from the end surface of the stopper large diameter portion 811, which is located on the reduced diameter portion 96 side, toward the stopper small diameter portion 812. The stopper hole 814 extends from the stopper recess 813 toward the radially outer side of the stopper large diameter portion 811 and is connected to the gap passage 804. In this way, the gap passage 803, the gap passage 804, the stopper hole 814 and the stopper recess 813 are connected to each other. Here, the gap passage 803, the gap passage 804, the stopper hole 814 and the stopper recess 813 form the secondary passage 802. The secondary passage 802 is formed at the stopper main body 81 and can conduct the fuel, which is located on the discharge valve 70 side of the stopper main body 81, to the other side of the stopper main body 81, which is opposite to the discharge valve 70.

In the present embodiment, the tubular portion 41 further includes a release passage 410. The connection passage 231 is formed to extend through the tubular portion 41. The release passage 410 extends in the axial direction of the tubular portion 41 from the end surface of the tubular portion 41 located on the stopper support 95 side and is connected to the connection passage 231 (see FIGS. 8 and 9). In this way, the release passage 410 connects between the discharge recess 104 and the connection passage 231.

The stopper support 95 further includes an inner projection 951 and an outer projection 952. The inner projection 951 is shaped in a ring form and extends from an inner periphery of the end surface of the stopper support 95, which is located on the tubular portion 41 side, toward the tubular portion 41, and the inner projection 951 contacts the end surface of the tubular portion 41, which is opposite to the seat portion 42. The outer projection 952 is shaped in a ring form and extends from an outer periphery of the end surface of the stopper support 95, which is located on the tubular portion 41 side, toward the tubular portion 41, and the outer projection 952 contacts the end surface of the tubular portion 41, which is opposite to the seat portion 42. Specifically, the outer projection 952 is located on the radially outer side of the inner projection 951 at the end surface of the stopper support 95, which is located on the tubular portion 41 side.

The stopper support 95 is threadably engaged with the housing main body 11 such that the inner projection 951 and the outer projection 952 are urged against the end surface of the tubular portion 41, which is located on the stopper support 95 side. In this way, the fluid tightness is maintained between the stopper support 95 and the tubular portion 41.

Here, the end part of the release passage 410, which is opposite to the connection passage 231, opens between the inner projection 951 and the outer projection 952 at the end surface of the tubular portion 41 located on the side where the stopper support 95 is located. Therefore, even in a case where the pressure of the fuel, which is present in the discharge passage 205 and the discharge passage 950, i.e., in the gap passage 803 and the gap passage 804, becomes high, and thereby the fuel flows into the space between the inner projection 951 and the outer projection 952 through a location between the stopper support 95 side end surface of the tubular portion 41 and the inner projection 951, the fuel can be released to the connection passage 231, which has the low pressure, through the release passage 410. In this way, it is possible to limit the leakage of the fuel, which is in the discharge passage 205 and the discharge passage 950, to the outside of the housing main body 11 through a location between the end surface of the tubular portion 41, which is located on the stopper support 95 side, and the outer projection 952, and also through a location between the inner peripheral wall of the discharge recess 104 of the housing main body 11 and the outer peripheral wall of the stopper support 95.

In order to avoid the chamfered part of the tubular portion 41 at the contact surface between the tubular portion 41 and the stopper support 95, an inner diameter of the stopper support 95 is set to be slightly larger than an inner diameter of the tubular portion 41. However, by setting the inner diameter of the stopper support 95 and the inner diameter of the tubular portion 41 to be generally equal to each other, a radial size of the stopper main body 81, i.e., a radial size of the stopper large diameter portion 811 is limited.

Furthermore, in the present embodiment, the stopper extension 83 is shaped in the substantially cylindrical rod form and projects from the center of the end surface of the stopper small diameter portion 812, which is located on the discharge valve 70 side, toward the discharge valve 70.

Even in the present embodiment, when the discharge valve 70 contacts the movement limit surface 800, the annular passage 400 is formed between the primary passages 701 and the secondary passage 802. At this time, the fuel in the pressurizing chamber 203 can flow toward the pipe 4 through the upstream passage 43, the passage between the discharge valve seat 44 and the discharge valve 70, the primary passages 701, the annular passage 400, the gap passage 803, the gap passage 804, the stopper hole 814, the stopper recess 813, i.e., the secondary passage 802 and the discharge passage 950 (see FIG. 9).

Other than the above described points, the structure of the second embodiment is similar to that of the first embodiment.

As discussed above, the high-pressure pump 1 of the present embodiment includes the housing 10, the seat portion 42, the discharge valve (serving as the valve) 70 and the stopper support 95.

The housing 10 includes the pressurizing chamber 203, which is configured to pressurize the fuel in the pressurizing chamber 203.

The tubular portion 41 forms the discharge passage 205, which is configured to conduct the fuel discharged from the pressurizing chamber 203.

The seat portion 42 includes: the upstream passage 43, which connects between the discharge passage 205 and the pressurizing chamber 203; and the discharge valve seat 44, which is formed on the side of the upstream passage 43, at which the discharge passage 205 is located.

The discharge valve 70 is configured to contact the discharge valve seat 44.

The stopper support 95 is the member formed separately from the tubular portion 41 and supports the stopper main body 81.

The stopper support 95 includes: the inner projection 951 that is shaped in the ring form and projects from the one end surface of the stopper support 95 toward the tubular portion 41 while the inner projection 951 contacts the end surface of the tubular portion 41, which is opposite to the seat portion 42; and the outer projection 952 that is shaped in the ring form and projects from the one end surface of the stopper support 95 toward the tubular portion 41 while the outer projection 952 is located on the radially outer side of the inner projection 951, and the outer projection 952 contacts the end surface of the tubular portion 41, which is opposite to the seat portion 42.

The tubular portion 41 includes the release passage 410, which opens between the inner projection 951 and the outer projection 952 at the end surface of the tubular portion 41 located on the side where the stopper support 95 is located. Here, the other end part of the release passage 410, which is opposite to the stopper support 95, is connected to the connection passage 231, which has the low pressure.

In the structure, in which the stopper support 95 is threadably engaged with the housing main body 11, and the fuel in the discharge passage 950 at the inside of the stopper support 95 and the discharge passage 205 becomes the high pressure like in the present embodiment, there is a possibility of that the fuel in the discharge passage 950 and the discharge passage 205 leaks to the outside of the housing main body 11 through the location between the end surface of the tubular portion 41, which is located on the stopper support 95 side, and the end surface of the stopper support 95, which is located on the tubular portion 41 side.

In the present embodiment, the inner projection 951 and the outer projection 952 are formed at the end surface of the stopper support 95, which is located on the tubular portion 41 side, and the release passage 410 is opened at the location between the inner projection 951 and the outer projection 952. Therefore, even in the case where the pressure of the fuel, which is present in the discharge passage 205 and the discharge passage 950, becomes high, and thereby the fuel flows into the space between the inner projection 951 and the outer projection 952 through the location between the stopper support 95 side end surface of the tubular portion 41 and the inner projection 951, the fuel can be released to the connection passage 231, which has the low pressure, through the release passage 410. In this way, it is possible to limit the leakage of the fuel, which is in the discharge passage 205 and the discharge passage 950, to the outside of the housing main body 11 through the location between the end surface of the tubular portion 41, which is located on the stopper support 95 side, and the outer projection 952, and also through the location between the inner peripheral wall of the discharge recess 104 of the housing main body 11 and the outer peripheral wall of the stopper support 95. Therefore, even if the high pressure fuel, which is present in the discharge passage 205 and the discharge passage 950, leaks, the fuel only leaks to the low pressure system in the inside of the high-pressure pump 1. Therefore, a risk of external leakage can be limited to the low pressure fuel.

Third Embodiment

Figure 10:
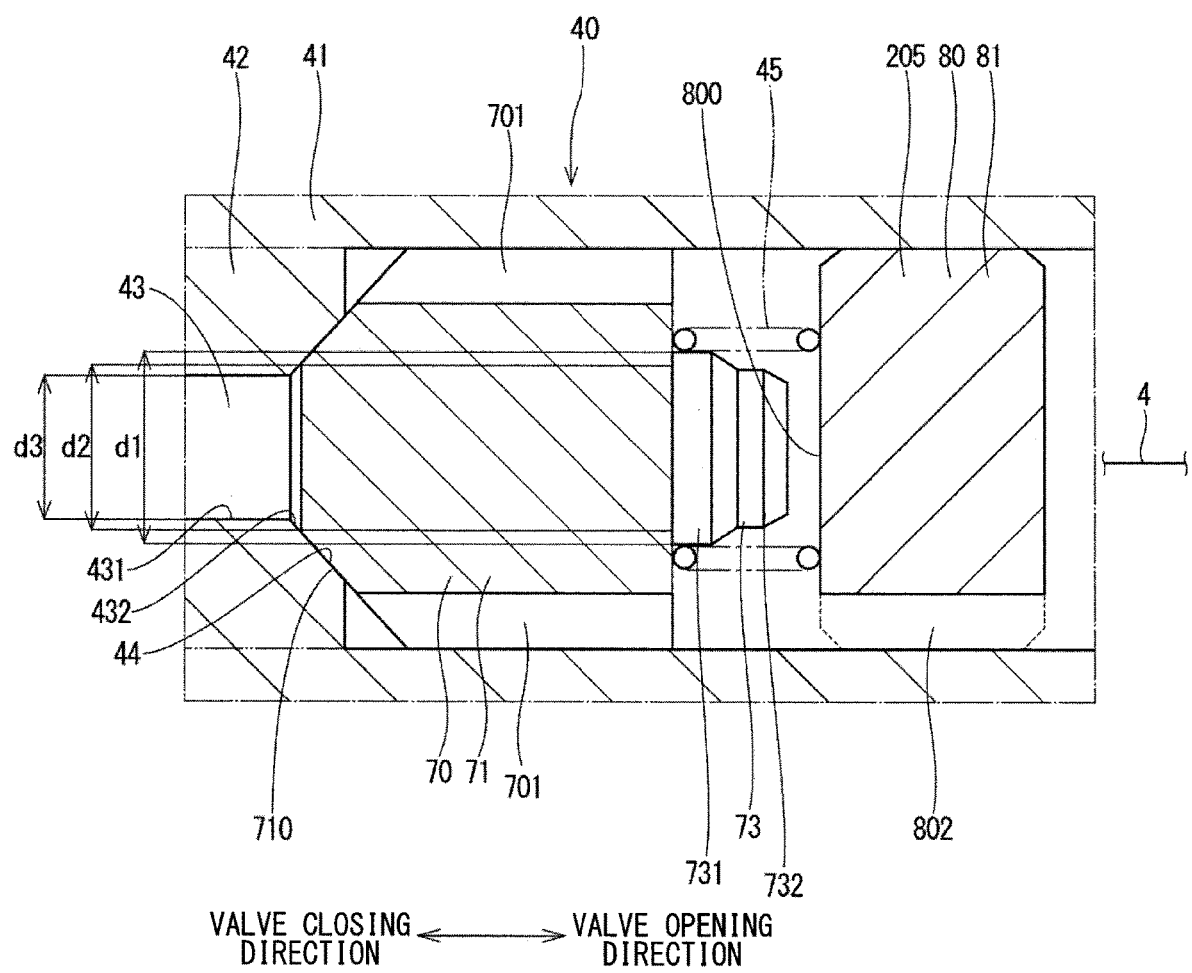
FIG. 10 is a cross-sectional view showing a discharge valve device of a high-pressure pump according to a third embodiment.
Figure 11:
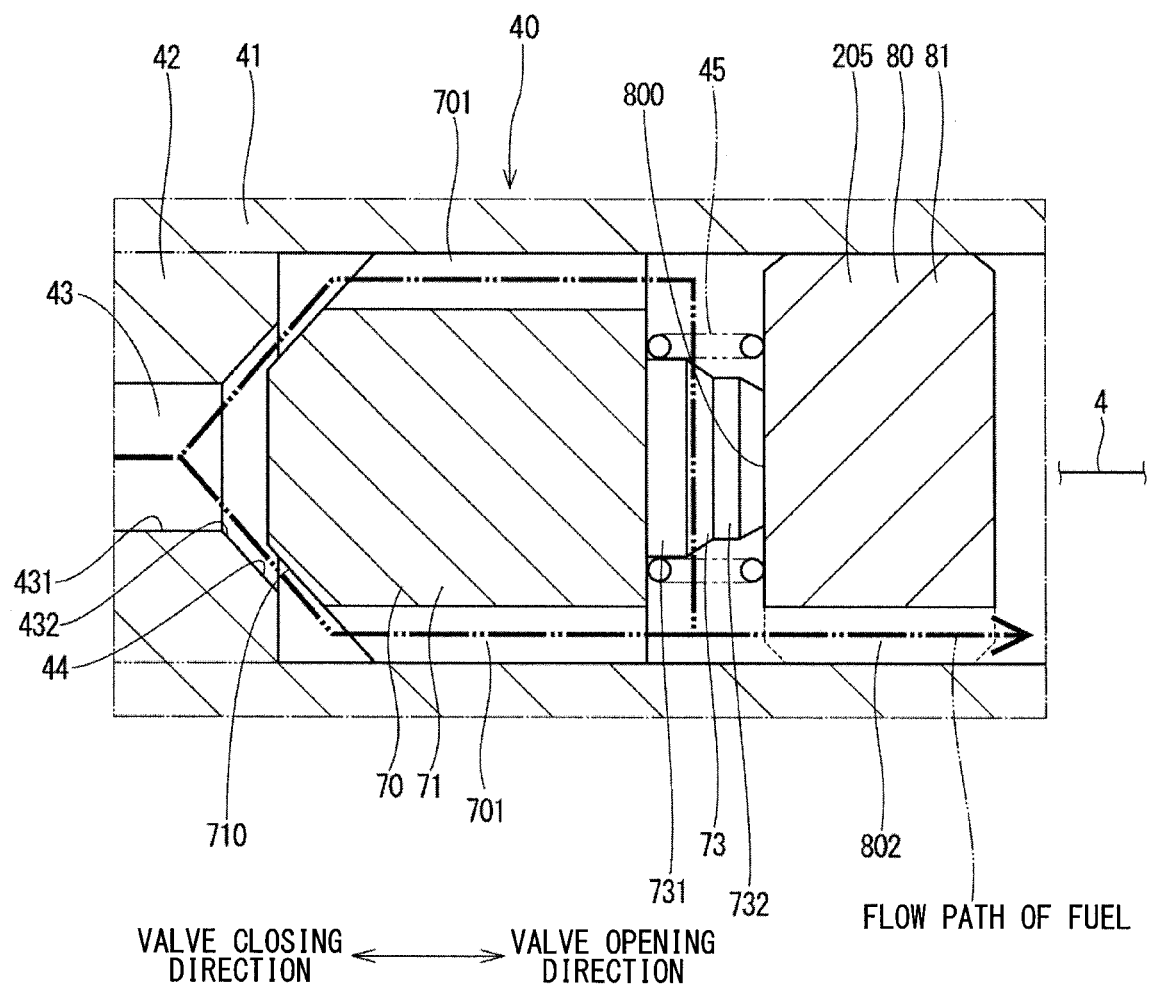
FIG. 11 is cross-sectional view showing the discharge valve device of the high-pressure pump according to the third embodiment in a valve opening state.

FIGS. 10 and 11 show a high-pressure pump according to a third embodiment. The third embodiment differs from the first embodiment with respect to the configuration of the discharge valve 70 and the configuration of the stopper 80.

In the third embodiment, the valve main body 71 is shaped in a substantially cylindrical rod form. The discharge valve 70 is placed between the seat portion 42 and the stopper 80 at the inside of the tubular portion 41 such that the valve main body 71 can reciprocate in the axial direction. The valve main body 71 slidably contacts the inner peripheral wall of the tubular portion 41 through the outer peripheral wall, i.e., the outer periphery of the valve main body 71 such that the axial movement of the valve main body 71 is guided by the inner peripheral wall of the tubular portion 41.

Each of the primary passages 701 is formed at the valve main body 71 and is located between the valve main body 71 and the inner peripheral wall of the tubular portion 41 (see FIGS. 10 and 11). Each of the primary passages 701 is radially inwardly recessed from a corresponding portion of the outer peripheral wall of the valve main body 71, which is shaped in the substantially cylindrical rod form, and the primary passage 701 extends in the axial direction. The number of the primary passages 701 is four, and these primary passages 701 are arranged at equal intervals in the circumferential direction of the valve main body 71. The fuel, which is located on the discharge valve seat 44 side of the valve main body 71, can flow through the primary passages 701 to the other side of the valve main body 71, which is opposite to the discharge valve seat 44.

The valve main body 71 includes a tapered portion 710. The tapered portion 710 is formed at an outer periphery of an end surface of the valve main body 71, which is located on the seat portion 42 side. The tapered portion 710 is tapered such that the tapered portion 710 progressively approaches the axis of the valve main body 71 from the stopper 80 side of the valve main body 71 toward the seat portion 42 side of the valve main body 71.

In the present embodiment, the discharge valve seat 44 is formed in a portion of the tapered surface 432 of the upstream passage 43 of the seat portion 42, which is located on the stopper 80 side. Specifically, the discharge valve seat 44 is tapered such that the discharge valve seat 44 progressively approaches the axis of the upstream passage 43 from the stopper 80 side toward the opposite side, which is opposite to the stopper 80. The discharge valve seat 44 is shaped in a tapered ring form.

The valve main body 71 is configured such that the tapered portion 710 can contact the discharge valve seat 44. A contactable range of the seat portion 42, which can contact the tapered portion 710, will be referred to as the discharge valve seat 44.

In the present embodiment, a diameter reduction ratio of the tapered portion 710, which is an approaching ratio of the tapered portion 710 toward the axis, and a diameter reduction ratio of the discharge valve seat 44 are substantially equal to each other.

The discharge valve 70 is opened when the tapered portion 710 is spaced away from the discharge valve seat 44. Also, the discharge valve 70 is closed when the tapered portion 710 contacts the discharge valve seat 44.

The valve extension 73 is formed at an end surface of the valve main body 71, which is opposite to the tapered portion 710. Here, an outer diameter of the first valve extension 731 is denoted by d1, a diameter of a boundary between the discharge valve seat 44 and the upstream passage 43 is denoted by d2. Furthermore, an inner diameter of the cylindrical surface 431 of the upstream passage 43 is denoted by d3. In such a case, the first valve extension 731, the discharge valve seat 44 and the cylindrical surface 431 are formed to satisfy a relationship of d1>d2>d3 (see FIG. 10). An inner diameter of the discharge valve seat 44 is equal to the diameter d2 of the boundary of the tapered surface 432 relative to the discharge valve seat 44 and an outer diameter of an end part of the tapered portion 710, which is located on the seat portion 42 side.

In the present embodiment, the stopper 80 does not have the stopper extension 83 discussed in the first embodiment. The movement limit surface 800 is formed at an end surface of the stopper main body 81, which is located on the discharge valve 70 side. The movement limit surface 800 can limit movement of the discharge valve 70 in a direction away from the discharge valve seat 44, i.e., in the valve opening direction when the movement limit surface 800 contacts the second valve extension 732 of the discharge valve 70.

When the second valve extension 732 of the discharge valve 70 contacts the movement limit surface 800, the annular passage 400 is formed around the valve extension 73 located between the primary passages 701 and the secondary passages 802. At this time, the fuel of the pressurizing chamber 203 can flow to the pipe 4 side through the upstream passage 43, a passage between the discharge valve seat 44 and the tapered portion 710 of the discharge valve 70, the primary passages 701, the annular passage 400 and the secondary passages 802 (see FIG. 11).

Other than the above described points, the structure of the third embodiment is similar to that of the first embodiment.

In the present embodiment, the valve main body 71 is shaped in the substantially cylindrical rod form, and the tapered portion 710, which is tapered and can contact the tapered discharge valve seat 44, is formed at the valve main body 71. Therefore, the radial size of the valve main body 71 can be reduced while a slide length between the outer peripheral wall of the valve main body 71 and the inner peripheral wall of the tubular portion 41 is lengthened.

Fourth Embodiment

Figure 12:
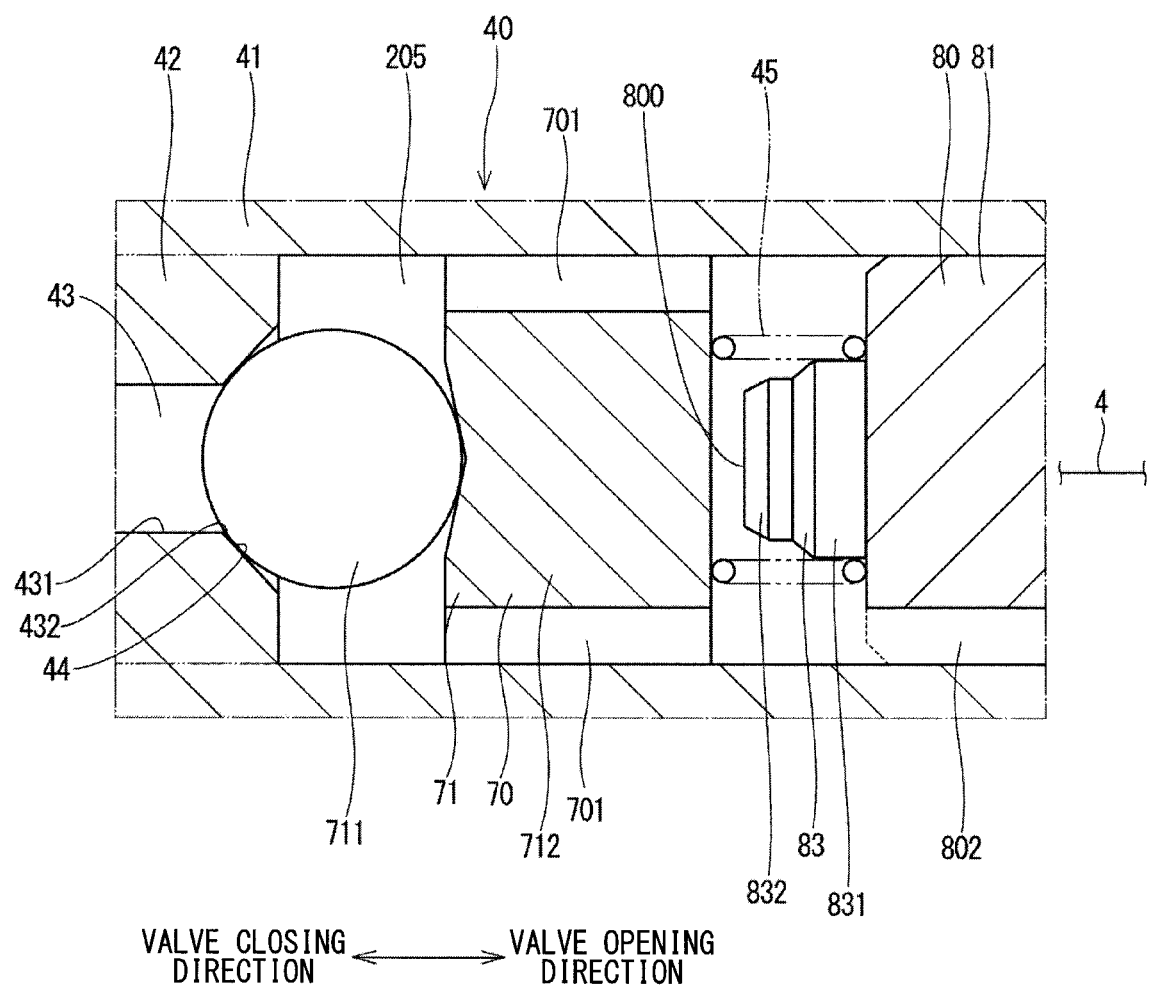
FIG. 12 is a cross-sectional view showing a discharge valve device of a high-pressure pump according to a fourth embodiment.
Figure 13:
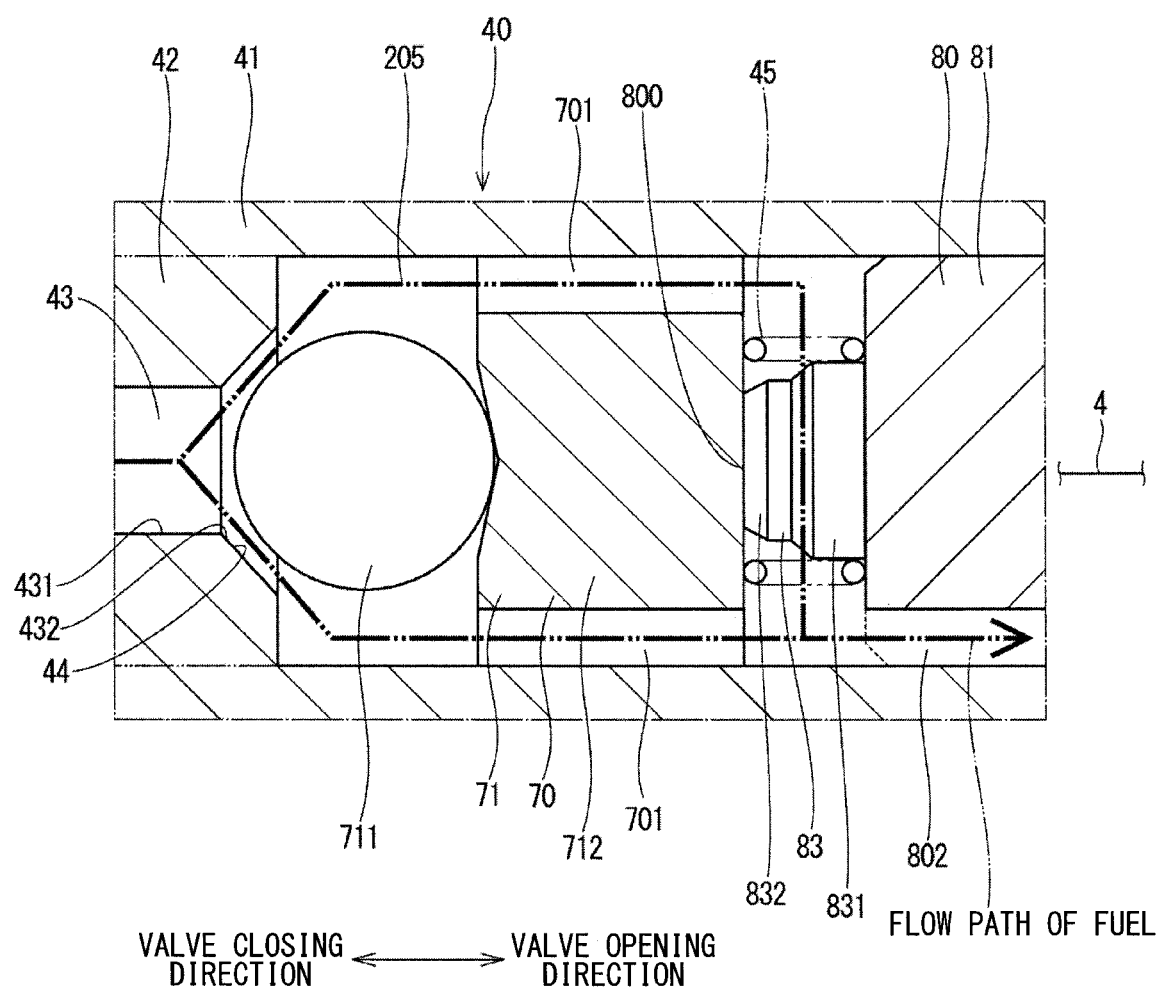
FIG. 13 is a cross-sectional view showing the discharge valve device of the high-pressure pump in a valve opening state according to the fourth embodiment.

FIGS. 12 and 13 show a high-pressure pump according to a fourth embodiment. The fourth embodiment differs from the third embodiment with respect to the configuration of the discharge valve 70 and the configuration of the stopper 80.

In the fourth embodiment, the valve main body 71 includes a ball 711 and a holder 712. The ball 711 is shaped in a spherical form and is made of metal, such as stainless steel. The ball 711 is configured to reciprocate at the inside of the tubular portion 41.

The holder 712 is shaped in a substantially cylindrical rod form and is made of metal, such as stainless steel. The holder 712 is placed between the ball 711 and the stopper 80 at the inside of the tubular portion 41 such that the holder 712 can reciprocate in the axial direction. The holder 712 slidably contacts the inner peripheral wall of the tubular portion 41 through an outer peripheral wall, i.e., an outer periphery of the holder 712 such that axial movement of the holder 712 is guided by the inner peripheral wall of the tubular portion 41.

Each of the primary passages 701 is formed at the holder 712 and is located between the holder 712 and the inner peripheral wall of the tubular portion 41 (see FIGS. 12 and 13). Each of the primary passages 701 is radially inwardly recessed from a corresponding portion of the outer peripheral wall of the holder 712, which is shaped in the substantially cylindrical rod form, and the primary passage 701 extends in the axial direction. The number of the primary passages 701 is four, and these primary passages 701 are arranged at equal intervals in the circumferential direction of the holder 712. The fuel, which is located on the discharge valve seat 44 side of the valve main body 71, can flow through the primary passages 701 to the other side of the valve main body 71, which is opposite to the discharge valve seat 44.

A recess is formed at an end surface of the holder 712, which is located on the seat portion 42 side, and the recess of the end surface of the holder 712 contacts the ball 711. In this way, the holder 712 can hold the ball 711.

The valve main body 71 is configured such that the ball 711 can contact the discharge valve seat 44. A contactable range of the seat portion 42, which can contact the ball 711, will be referred to as the discharge valve seat 44.

The discharge valve 70 is opened when the ball 711 is spaced away from the discharge valve seat 44. Also, the discharge valve 70 is closed when the ball 711 contacts the discharge valve seat 44.

In the present embodiment, the discharge valve 70 does not have the valve extension 73 discussed in the first embodiment. The movement limit surface 800 can limit movement of the discharge valve 70 in a direction away from the discharge valve seat 44, i.e., in the valve opening direction when the movement limit surface 800 contacts an end surface of the holder 712 of the discharge valve 70, which is located on the stopper 80 side.

When the holder 712 of the discharge valve 70 contacts the movement limit surface 800, the annular passage 400 is formed around the stopper extension 83 located between the primary passages 701 and the secondary passages 802. At this time, the fuel of the pressurizing chamber 203 can flow to the pipe 4 side through the upstream passage 43, a passage between the discharge valve seat 44 and the ball 711 of the discharge valve 70, the primary passages 701, the annular passage 400 and the secondary passages 802 (see FIG. 13).

Other than the above described points, the structure of the fourth embodiment is similar to that of the third embodiment.

In the present embodiment, the valve main body 71 is formed by the ball 711, which is shaped in the spherical form, and the holder 712, which is shaped in the substantially cylindrical rod form. Furthermore, the discharge valve seat 44, which is tapered and can contact the ball 711, is formed at the seat portion 42. Therefore, the radial size of the valve main body 71 can be reduced while a slide length between the outer peripheral wall of the holder 712 of the valve main body 71 and the inner peripheral wall of the tubular portion 41 is lengthened.

Other Embodiments

In the first and second embodiments, there is described the example where the discharge valve 70 includes the valve extension 73, and the stopper 80 includes the stopper extension 83. Alternatively, in another embodiment of the present disclosure, the discharge valve 70 may not include the valve extension 73. Furthermore, the stopper 80 may not include the stopper extension 83. In the case where the valve extension 73 and the stopper extension 83 are not formed, it is desirable to form a spring seat, which is recessed to such an extent that the end part of the spring 45 can be engaged to the recessed spring seat.

In another embodiment of the present disclosure, the valve extension 73 may include only the first valve extension 731 while eliminating the second valve extension 732 from the valve extension 73. Furthermore, the stopper extension 83 may include only the first stopper extension 831 while eliminating the second stopper extension 832 from the stopper extension 83.

Furthermore, in another embodiment of the present disclosure, the end part of the first valve extension 731 and the end part of the second valve extension 732 may not be chamfered in the taper form. Furthermore, the end part of the first stopper extension 831 and the end part of the second stopper extension 832 may not be chamfered in the taper form. Also, the inner peripheral surface of the spring 45 may not contact the outer peripheral wall of the valve extension 73 or the outer peripheral wall of the stopper extension 83.

Furthermore, in another embodiment of the present disclosure, the outer diameter of the first valve extension 731 may be set to be equal to or smaller than the inner diameter of the discharge valve seat 44.

Furthermore, in another embodiment of the present disclosure, the secondary passage(s) 802 is not necessarily limited to the secondary passage(s) 802 formed at the stopper main body 81 and is located between the stopper main body 81 and the inner peripheral wall of the tubular portion 41. For instance, the secondary passage(s) 802 may be formed on a radially inner side of the outer periphery of the stopper main body 81 such that the secondary passage(s) 802 connects between the discharge valve 70 side of the stopper main body 81 and the other side of the stopper main body 81, which is opposite to the discharge valve 70. However, it is desirable that in order to ensure a required passage cross-sectional area of the secondary passage(s) 802, the secondary passage(s) 802 is formed at the stopper main body 81 at the location between the stopper main body 81 and the inner peripheral wall of the tubular portion 41 by notching, i.e., recessing the outer periphery of the stopper main body 81.

Furthermore, in another embodiment of the present disclosure, the tubular portion 41 and the seat portion 42 may be formed separately from one another. Also, the tubular portion 41 and the housing main body 11 may be formed separately from one another.

Furthermore, the present disclosure may be applied to, for example, the suction valve device 30 of the high-pressure pump 1. In such a case, the tubular portion, the seat portion, the valve and the stopper may be placed at the suction passage 204, and the stopper may be placed on the pressurizing chamber 203 side of the valve, and the secondary passage(s) may be connected to the pressurizing chamber 203.

Furthermore, the present disclosure may be applied to for example, a relief valve device of the high-pressure pump. Here, it is assumed that the relief valve device releases the fuel to the low pressure side when the pressure of the fuel in the discharge passage 205 becomes a high pressure. In such a case, the tubular portion, the seat portion, the valve and the stopper may be placed in a relief passage that is connected to the discharge passage 205, and the valve may be placed on the discharge passage 205 side of the stopper. Also, the upstream passage may be connected to the discharge passage 205.

Furthermore, the present disclosure is not necessarily limited to the high-pressure pump of the vehicle and may be implemented at another type of pump device.

As described above, the present disclosure should not be limited to the above embodiments and may be implemented in various other forms within a principle of the present disclosure.

The present disclosure has been described with reference to the embodiments. However, the present disclosure should not be limited to the embodiments and the structures described therein. The present disclosure covers various modifications and variations on the scope of equivalents. Also, various combinations and forms as well as other combinations, each of which includes only one element or more or less of the various combinations, are also within the scope and spirit of the present disclosure.

The invention claimed is:

1. A high-pressure pump comprising:
   a housing that includes a pressurizing chamber, which is configured to pressurize fuel in the pressurizing chamber;
   a tubular portion that forms a discharge passage, which is configured to conduct the fuel discharged from the pressurizing chamber;
   a seat portion that includes:
     an upstream passage, which connects between the discharge passage and the pressurizing chamber; and
     a valve seat, which is formed on a side of the upstream passage where the discharge passage is located;
   a valve that includes:
     a valve main body that slidably contacts an inner peripheral wall of the tubular portion through an outer periphery of the valve main body such that axial movement of the valve main body is guided by the inner peripheral wall of the tubular portion while the valve main body is configured to contact the valve seat; and
     a plurality of primary passages that are formed at the valve main body and are located between the valve main body and the inner peripheral wall of the tubular portion, wherein the plurality of primary passages is configured to move integrally with the valve main body and conduct the fuel from one side of the valve main body, at which the valve seat is located, to another side of the valve main body, which is opposite to the valve seat; and
   a stopper that includes:
     a stopper main body that is formed separately from the tubular portion, wherein the stopper main body is located on the another side of the valve that is opposite to the valve seat;

a movement limit surface that is planar and extends across a central axis of the stopper in a direction perpendicular to the central axis of the stopper, wherein the movement limit surface is configured to limit movement of the valve in a direction away from the valve seat when the movement limit surface contacts the valve; and a secondary passage that is formed at the stopper main body and is configured to conduct the fuel from one side of the stopper main body, at which the valve is located, to another side of the stopper main body, which is opposite to the valve, wherein:

the plurality of primary passages is located on one side of the movement limit surface where the valve seat is located;

the secondary passage is located on another side of the movement limit surface, which is opposite to the valve seat;

the plurality of primary passages is arranged in a circumferential direction of the valve main body;

the valve has a contact surface that is planar and extends across a central axis of the valve in a direction perpendicular to the central axis of the valve;

when the contact surface of the valve contacts the movement limit surface of the stopper, an annular passage, which communicates between the plurality of primary passages and the secondary passage, is formed to circumferentially extend all around the movement limit surface;

the valve further includes a valve extension that has the contact surface and extends from the valve main body toward the stopper;

the annular passage is formed at an outside of the valve extension when the contact surface of the valve extension contacts the movement limit surface;

the valve main body is shaped in a circular disk form; and an outer diameter of the valve extension is larger than a diameter of the upstream passage.

2. The high-pressure pump according to claim 1, wherein the plurality of primary passages is arranged at equal intervals in the circumferential direction of the valve main body.

3. The high-pressure pump according to claim 1, further comprising a spring that is configured to urge the valve toward the valve seat, wherein an inner peripheral surface of the spring is configured to contact an outer peripheral wall of the valve extension.

4. The high-pressure pump according to claim 1, wherein:
the stopper further includes a stopper extension that extends from the stopper main body toward the valve and has the movement limit surface at a distal end part of the stopper extension; and
the annular passage is formed at an outside of the stopper extension when the contact surface of the valve extension of the valve contacts the movement limit surface.

5. The high-pressure pump according to claim 4, further comprising a spring that is configured to urge the valve toward the valve seat, wherein an inner peripheral surface of the spring is configured to contact an outer peripheral wall of the stopper extension.

6. The high-pressure pump according to claim 1, wherein the stopper is configured such that the stopper main body is supported by the inner peripheral wall of the tubular portion.

7. The high-pressure pump according to claim 1, wherein:
an outer periphery of the valve is configured to slide along the tubular portion; and
the plurality of primary passages is radially inwardly recessed from the outer periphery of the valve.

8. The high-pressure pump according to claim 1, wherein the secondary passage is located on a radially outer side of the movement limit surface.

9. The high-pressure pump according to claim 1, wherein the tubular portion is formed integrally in one piece with the housing, which forms the pressurizing chamber.

10. The high-pressure pump according to claim 1, wherein the contact surface of the valve and the movement limit surface of the stopper are configured to make a surface-to-surface contact every time the contact surface of the valve contacts the movement limit surface of the stopper in response to movement of the valve main body away from the valve seat.

11. A high-pressure pump comprising:
a housing that includes a pressurizing chamber, which is configured to pressurize fuel in the pressurizing chamber;
a tubular portion that forms a discharge passage, which is configured to conduct the fuel discharged from the pressurizing chamber;
a seat portion that includes:
an upstream passage, which connects between the discharge passage and the pressurizing chamber; and
a valve seat, which is formed on a side of the upstream passage where the discharge passage is located;
a valve that includes:
a valve main body that slidably contacts an inner peripheral wall of the tubular portion through an outer periphery of the valve main body such that axial movement of the valve main body is guided by the inner peripheral wall of the tubular portion while the valve main body is configured to contact the valve seat; and
a plurality of primary passages that are formed at the valve main body and are located between the valve main body and the inner peripheral wall of the tubular portion, wherein the plurality of primary passages is configured to move integrally with the valve main body and conduct the fuel from one side of the valve main body, at which the valve seat is located, to another side of the valve main body, which is opposite to the valve seat;
a stopper that includes:
a stopper main body that is formed separately from the tubular portion, wherein the stopper main body is located on the another side of the valve that is opposite to the valve seat;
a movement limit surface that is planar and extends across a central axis of the stopper in a direction perpendicular to the central axis of the stopper, wherein the movement limit surface is configured to limit movement of the valve in a direction away from the valve seat when the movement limit surface contacts the valve; and
a secondary passage that is formed at the stopper main body and is configured to conduct the fuel from one side of the stopper main body, at which the valve is located, to another side of the stopper main body, which is opposite to the valve; and
a stopper support that is formed separately from the tubular portion and supports the stopper main body, wherein:
the plurality of primary passages is located on one side of the movement limit surface where the valve seat is located;

the secondary passage is located on another side of the movement limit surface, which is opposite to the valve seat;

the plurality of primary passages is arranged in a circumferential direction of the valve main body;

the valve has a contact surface that is planar and extends across a central axis of the valve in a direction perpendicular to the central axis of the valve;

when the contact surface of the valve contacts the movement limit surface of the stopper, an annular passage, which communicates between the plurality of primary passages and the secondary passage, is formed to circumferentially extend all around the movement limit surface;

the stopper support includes:
   an inner projection that is shaped in a ring form and projects from one end surface of the stopper support toward the tubular portion, wherein the inner projection contacts an end surface of the tubular portion, which is located on a side that is opposite to the seat portion; and
   an outer projection that is shaped in a ring form and projects from the one end surface of the stopper support toward the tubular portion while the outer projection is located on a radially outer side of the inner projection, wherein the outer projection contacts the end surface of the tubular portion, which is opposite to the seat portion; and the tubular portion includes a release passage that opens between the inner projection and the outer projection at the end surface of the tubular portion located on the side where the stopper support is located.

12. A high-pressure pump comprising:

a housing that includes a pressurizing chamber, which is configured to pressurize fuel in the pressurizing chamber;

a tubular portion that forms a discharge passage, which is configured to conduct the fuel discharged from the pressurizing chamber;

a seat portion that includes:
   an upstream passage, which connects between the discharge passage and the pressurizing chamber; and
   a valve seat, which is formed on a side of the upstream passage where the discharge passage is located;

a valve that is configured to contact the valve seat;

a stopper main body that is formed separately from the tubular portion, wherein the stopper main body is located on the another side of the valve that is opposite to the valve seat; and a stopper support that is formed separately from the tubular portion and supports the stopper main body, wherein:

the stopper support includes:
   an inner projection that is shaped in a ring form and projects from one end surface of the stopper support toward the tubular portion, wherein the inner projection contacts an end surface of the tubular portion, which is located on a side that is opposite to the seat portion; and
   an outer projection that is shaped in a ring form and projects from the one end surface of the stopper support toward the tubular portion while the outer projection is located on a radially outer side of the inner projection, wherein the outer projection contacts the end surface of the tubular portion, which is opposite to the seat portion; and the tubular portion includes a release passage that opens between the inner projection and the outer projection at the end surface of the tubular portion located on the side where the stopper support is located.

* * * * *